(12) United States Patent
Lai et al.

(10) Patent No.: US 12,174,346 B2
(45) Date of Patent: Dec. 24, 2024

(54) OPTICAL IMAGING LENS

(71) Applicant: GENIUS ELECTRONIC OPTICAL (XIAMEN) CO., LTD., Fujian (CN)

(72) Inventors: Yongfeng Lai, Fujian (CN); JianPeng Li, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 904 days.

(21) Appl. No.: 17/179,404

(22) Filed: Feb. 19, 2021

(65) Prior Publication Data
US 2022/0179172 A1    Jun. 9, 2022

(30) Foreign Application Priority Data
Dec. 9, 2020 (CN) .......................... 202011428409.5

(51) Int. Cl.
G02B 13/00 (2006.01)
G02B 9/64 (2006.01)
G02B 27/00 (2006.01)

(52) U.S. Cl.
CPC ........... G02B 13/0045 (2013.01); G02B 9/64 (2013.01); G02B 27/0025 (2013.01)

(58) Field of Classification Search
CPC .. G02B 13/0045; G02B 9/64; G02B 27/0025; G02B 3/04; G02B 13/18
See application file for complete search history.

(56) References Cited

U.S. PATENT DOCUMENTS

| | | | | |
|---|---|---|---|---|
| 2020/0371316 A1* | 11/2020 | Wang | ........................ | G02B 9/64 |
| 2021/0132336 A1* | 5/2021 | Chen | ........................ | G02B 9/64 |
| 2021/0181477 A1* | 6/2021 | Guo | ................... | G02B 13/0045 |
| 2022/0099935 A1* | 3/2022 | Yu | ....................... | G02B 13/0045 |
| 2022/0099936 A1* | 3/2022 | Chen | ........................ | G02B 9/64 |
| 2022/0099939 A1* | 3/2022 | Chen | ...................... | G02B 13/02 |
| 2022/0113508 A1* | 4/2022 | Shi | ..................... | G02B 13/0045 |

OTHER PUBLICATIONS

Gross Herbert et al. Handbook of Optical Systems, 2007, Wiley-VCH, vol. 3: Aberration Theory and Correction of Optical Systems, pp. 377-379 (Year: 2007).*

* cited by examiner

*Primary Examiner* — Marin Pichler
*Assistant Examiner* — K Muhammad
(74) *Attorney, Agent, or Firm* — JCIPRNET

(57) ABSTRACT

An optical imaging lens is provided. The optical imaging lens includes a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element comprises an object-side surface facing the object side and allowing imaging rays to pass through and an image-side surface facing the image side and allowing the imaging rays to pass through. The second lens element has negative refracting power. The fifth lens element has positive refracting power. An optical axis region of the image-side surface of the seventh lens element is convex. Lens elements of the optical imaging lens are only the eight lens elements described above.

20 Claims, 36 Drawing Sheets

| First embodiment | | | | | | |
|---|---|---|---|---|---|---|
| EFL=6.564 mm, HFOV=41.993°, system length=8.316 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.935 | | | |
| First lens element 1 | Object-side surface 15 | 2.730 | 1.123 | 1.545 | 55.987 | 7.510 |
| | Image-side surface 16 | 6.976 | 0.158 | | | |
| Second lens element 2 | Object-side surface 25 | 6.307 | 0.243 | 1.671 | 19.243 | -16.849 |
| | Image-side surface 26 | 3.999 | 0.055 | | | |
| Third lens element 3 | Object-side surface 35 | 7.538 | 0.280 | 1.615 | 25.920 | 23.791 |
| | Image-side surface 36 | 15.218 | 0.300 | | | |
| Fourth lens element 4 | Object-side surface 45 | 25.130 | 0.293 | 1.671 | 19.243 | -72.143 |
| | Image-side surface 46 | 16.519 | 0.082 | | | |
| Fifth lens element 5 | Object-side surface 55 | 39.256 | 0.376 | 1.671 | 19.243 | 28.497 |
| | Image-side surface 56 | -37.850 | 0.667 | | | |
| Sixth lens element 6 | Object-side surface 65 | 8.111 | 0.289 | 1.671 | 19.243 | -14.203 |
| | Image-side surface 66 | 4.338 | 0.071 | | | |
| Seventh lens element 7 | Object-side surface 75 | 8.029 | 1.953 | 1.535 | 55.690 | 4.279 |
| | Image-side surface 76 | -2.943 | 0.835 | | | |
| Eighth lens element 8 | Object-side surface 85 | -2.724 | 0.617 | 1.535 | 55.690 | -3.590 |
| | Image-side surface 86 | 7.101 | 0.500 | | | |
| Filter 9 | Object-side surface 95 | Infinity | 0.210 | 1.517 | 64.167 | |
| | Image-side surface 96 | Infinity | 0.263 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 0.000000E+00 | 1.687675E-03 | 5.238075E-04 | 1.209835E-04 | -3.234847E-04 |
| 16 | 0.000000E+00 | -3.572555E-03 | 3.283352E-04 | 3.798108E-05 | 1.899903E-04 |
| 25 | 0.000000E+00 | -2.703403E-02 | 1.919817E-03 | 2.573295E-03 | -1.310374E-03 |
| 26 | 1.870660E+00 | -2.317670E-02 | 2.840368E-04 | 1.015253E-03 | 3.739602E-04 |
| 35 | 0.000000E+00 | 6.925820E-03 | 1.717534E-04 | -8.685740E-04 | 1.446397E-03 |
| 36 | 0.000000E+00 | 3.067603E-03 | 8.573649E-04 | 1.886894E-03 | -1.335279E-03 |
| 45 | 0.000000E+00 | -1.589971E-02 | -1.756779E-03 | -5.941614E-04 | -5.342603E-04 |
| 46 | 0.000000E+00 | -2.059339E-02 | -1.720527E-02 | 2.478600E-02 | -2.849144E-02 |
| 55 | 0.000000E+00 | -2.372959E-02 | -1.614097E-02 | 2.773958E-02 | -3.059331E-02 |
| 56 | 0.000000E+00 | -1.967687E-02 | 1.952955E-03 | 2.399269E-03 | -2.883371E-03 |
| 65 | 0.000000E+00 | -4.314503E-02 | 7.505115E-03 | 2.625512E-03 | -4.492284E-03 |
| 66 | 9.058832E-01 | -5.276728E-02 | 1.021173E-02 | 7.144106E-04 | -2.105335E-03 |
| 75 | 0.000000E+00 | -1.885214E-02 | 2.612618E-03 | 1.337693E-03 | -8.029848E-04 |
| 76 | -6.310693E-01 | 8.410517E-03 | 2.105528E-04 | -1.528585E-03 | 7.593955E-04 |
| 85 | -1.661986E+00 | -6.190248E-03 | -1.873327E-03 | 1.105307E-04 | 1.260115E-04 |
| 86 | 0.000000E+00 | -1.547814E-02 | 2.152931E-03 | -2.839752E-04 | 2.626281E-05 |
| Surface | $a_{12}$ | $a_{14}$ | $a_{16}$ | $a_{18}$ | $a_{20}$ |
| 15 | 2.074040E-04 | -5.123763E-05 | 4.872360E-06 | 0.000000E+00 | 0.000000E+00 |
| 16 | -1.947754E-04 | 6.995181E-05 | -8.072741E-06 | 0.000000E+00 | 0.000000E+00 |
| 25 | 3.323872E-04 | -3.174376E-05 | -5.052087E-07 | 0.000000E+00 | 0.000000E+00 |
| 26 | -9.402362E-04 | 4.707861E-04 | -7.592638E-05 | 0.000000E+00 | 0.000000E+00 |
| 35 | -1.139958E-03 | 4.525880E-04 | -7.195901E-05 | 0.000000E+00 | 0.000000E+00 |
| 36 | 9.693614E-04 | -3.330062E-04 | 3.528791E-05 | 0.000000E+00 | 0.000000E+00 |
| 45 | 8.085216E-04 | -2.990516E-04 | 3.625000E-05 | 0.000000E+00 | 0.000000E+00 |
| 46 | 1.688418E-02 | -4.757432E-03 | 5.151866E-04 | 0.000000E+00 | 0.000000E+00 |
| 55 | 1.757644E-02 | -4.886444E-03 | 5.211787E-04 | 0.000000E+00 | 0.000000E+00 |
| 56 | 1.506051E-03 | -3.967329E-04 | 4.069601E-05 | 0.000000E+00 | 0.000000E+00 |
| 65 | 2.344063E-03 | -6.741931E-04 | 1.219176E-04 | -1.375791E-05 | 7.266096E-07 |
| 66 | 9.139536E-04 | -1.986809E-04 | 2.376901E-05 | -1.494298E-06 | 3.866181E-08 |
| 75 | 1.974394E-04 | -2.773608E-05 | 2.267657E-06 | -9.857096E-08 | 1.720236E-09 |
| 76 | -1.630056E-04 | 1.904329E-05 | -1.274472E-06 | 4.616831E-08 | -7.039760E-10 |
| 85 | -2.527085E-05 | 2.180244E-06 | -1.000285E-07 | 2.398907E-09 | -2.377200E-11 |
| 86 | -1.554260E-06 | 4.697371E-08 | -1.635140E-10 | -2.497300E-11 | 4.200000E-13 |

FIG. 9

| Second embodiment ||||||
|---|---|---|---|---|---|
| EFL=6.863 mm, HFOV=39.228°, system length=8.386 mm, Fno=1.650, image height=5.800 mm ||||||
| Device | Surface | Radius of curvature (mm) | Distance (mm) | Refractive index | Abbe number | Focal length (mm) |
| Object | | | Infinity | | | |
| Aperture 0 | | Infinity | -0.880 | | | |
| First lens element 1 | Object-side surface 15 | 2.962 | 0.910 | 1.545 | 55.987 | 7.352 |
| | Image-side surface 16 | 10.063 | 0.041 | | | |
| Second lens element 2 | Object-side surface 25 | 5.755 | 0.389 | 1.671 | 19.243 | -15.274 |
| | Image-side surface 26 | 3.597 | 0.141 | | | |
| Third lens element 3 | Object-side surface 35 | 5.348 | 0.572 | 1.535 | 55.690 | 20.091 |
| | Image-side surface 36 | 10.206 | 0.524 | | | |
| Fourth lens element 4 | Object-side surface 45 | -50.082 | 0.543 | 1.640 | 23.529 | 875.127 |
| | Image-side surface 46 | -46.194 | 0.230 | | | |
| Fifth lens element 5 | Object-side surface 55 | -16.350 | 0.720 | 1.640 | 23.529 | 40.720 |
| | Image-side surface 56 | -10.248 | 0.594 | | | |
| Sixth lens element 6 | Object-side surface 65 | 13.438 | 0.256 | 1.661 | 20.373 | -16.433 |
| | Image-side surface 66 | 5.991 | 0.064 | | | |
| Seventh lens element 7 | Object-side surface 75 | 10.988 | 0.987 | 1.535 | 55.690 | 5.405 |
| | Image-side surface 76 | -3.822 | 1.098 | | | |
| Eighth lens element 8 | Object-side surface 85 | -3.542 | 0.202 | 1.535 | 55.690 | -4.040 |
| | Image-side surface 86 | 5.711 | 0.500 | | | |
| Filter 9 | Object-side surface 95 | Infinity | 0.210 | 1.517 | 64.167 | |
| | Image-side surface 96 | Infinity | 0.405 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 0.000000E+00 | 6.710344E-04 | 5.618322E-05 | 1.953062E-04 | -1.521807E-04 |
| 16 | 0.000000E+00 | -7.628266E-03 | 6.326800E-03 | -3.930451E-03 | 1.779003E-03 |
| 25 | 0.000000E+00 | -1.604067E-02 | 5.306424E-03 | -2.665214E-03 | 1.266866E-03 |
| 26 | 1.599559E+00 | -1.342376E-02 | -1.117968E-03 | 5.409483E-04 | -1.215317E-04 |
| 35 | 0.000000E+00 | 2.598986E-03 | -1.859529E-03 | 1.926806E-03 | -1.203461E-03 |
| 36 | 0.000000E+00 | -3.930136E-04 | -1.554221E-03 | 2.859204E-03 | -2.194424E-03 |
| 45 | 0.000000E+00 | -1.901320E-02 | -6.102474E-04 | -2.500693E-03 | 1.990421E-03 |
| 46 | 0.000000E+00 | -2.058020E-02 | -4.598932E-03 | 2.446892E-03 | -1.824764E-03 |
| 55 | 0.000000E+00 | -1.888071E-02 | -3.489589E-03 | 1.323930E-03 | -1.341231E-03 |
| 56 | 0.000000E+00 | -1.693345E-02 | -1.381596E-03 | 3.583913E-04 | -5.045584E-05 |
| 65 | 0.000000E+00 | -2.492987E-02 | -2.060783E-03 | 1.071115E-03 | -6.745271E-04 |
| 66 | 1.425065E+00 | -3.290910E-02 | 4.670927E-03 | -1.199899E-03 | 3.907032E-04 |
| 75 | 0.000000E+00 | -2.000371E-02 | 6.399017E-03 | -1.436064E-03 | 2.133018E-04 |
| 76 | -5.610422E-01 | 1.076575E-02 | -4.182050E-04 | -5.431184E-04 | 2.120442E-04 |
| 85 | -3.229687E+00 | -3.867588E-03 | -2.027268E-03 | 3.188774E-04 | 1.069630E-05 |
| 86 | 0.000000E+00 | -1.864272E-02 | 2.121313E-03 | -2.405553E-04 | 2.304229E-05 |
| Surface | $a_{12}$ | $a_{14}$ | $a_{16}$ | $a_{18}$ | $a_{20}$ |
| 15 | 6.291608E-05 | -1.249293E-05 | 1.047963E-06 | 0.000000E+00 | 0.000000E+00 |
| 16 | -4.866317E-04 | 7.361236E-05 | -4.605282E-06 | 0.000000E+00 | 0.000000E+00 |
| 25 | -3.619919E-04 | 5.666390E-05 | -3.727735E-06 | 0.000000E+00 | 0.000000E+00 |
| 26 | -5.460935E-06 | 2.108610E-05 | -4.354530E-06 | 0.000000E+00 | 0.000000E+00 |
| 35 | 5.093214E-04 | -9.154800E-05 | 6.367346E-06 | 0.000000E+00 | 0.000000E+00 |
| 36 | 1.021024E-03 | -2.472698E-04 | 2.588865E-05 | 0.000000E+00 | 0.000000E+00 |
| 45 | -8.640336E-04 | 1.963476E-04 | -1.644384E-05 | 0.000000E+00 | 0.000000E+00 |
| 46 | 9.033855E-04 | -2.084272E-04 | 1.932252E-05 | 0.000000E+00 | 0.000000E+00 |
| 55 | 7.412663E-04 | -1.739363E-04 | 1.403869E-05 | 0.000000E+00 | 0.000000E+00 |
| 56 | 1.742103E-05 | -6.107545E-06 | 4.899651E-07 | 0.000000E+00 | 0.000000E+00 |
| 65 | 3.514970E-04 | -1.000128E-04 | 1.539805E-05 | -1.268530E-06 | 4.430215E-08 |
| 66 | -8.251439E-05 | 1.023911E-05 | -7.475849E-07 | 3.031962E-08 | -5.357830E-10 |
| 75 | -1.917851E-05 | 8.891304E-07 | -1.060914E-08 | -6.038000E-10 | 1.697300E-11 |
| 76 | -3.376167E-05 | 2.867245E-06 | -1.374303E-07 | 3.528251E-09 | -3.787100E-11 |
| 85 | -4.896614E-06 | 4.137056E-07 | -1.685556E-08 | 3.479370E-10 | -2.927000E-12 |
| 86 | -1.686289E-06 | 8.382968E-08 | -2.604392E-09 | 4.562200E-11 | -3.460000E-13 |

FIG. 13

| Third embodiment | | | | | | |
|---|---|---|---|---|---|---|
| EFL=6.605 mm, HFOV=39.493°, system length=8.182 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.853 | | | |
| First lens element 1 | Object-side surface 15 | 2.848 | 1.007 | 1.545 | 55.987 | 7.087 |
| | Image-side surface 16 | 9.422 | 0.048 | | | |
| Second lens element 2 | Object-side surface 25 | 5.307 | 0.293 | 1.671 | 19.243 | -15.544 |
| | Image-side surface 26 | 3.450 | 0.138 | | | |
| Third lens element 3 | Object-side surface 35 | 5.896 | 0.452 | 1.535 | 55.690 | 20.138 |
| | Image-side surface 36 | 12.613 | 0.544 | | | |
| Fourth lens element 4 | Object-side surface 45 | -17.099 | 0.452 | 1.544 | 49.922 | -384.621 |
| | Image-side surface 46 | -18.787 | 0.129 | | | |
| Fifth lens element 5 | Object-side surface 55 | -16.413 | 0.465 | 1.671 | 19.243 | 115.093 |
| | Image-side surface 56 | -13.715 | 0.518 | | | |
| Sixth lens element 6 | Object-side surface 65 | 9.426 | 0.498 | 1.582 | 30.186 | -22.337 |
| | Image-side surface 66 | 5.373 | 0.178 | | | |
| Seventh lens element 7 | Object-side surface 75 | 11.608 | 1.099 | 1.535 | 55.690 | 5.082 |
| | Image-side surface 76 | -3.450 | 1.062 | | | |
| Eighth lens element 8 | Object-side surface 85 | -3.163 | 0.280 | 1.535 | 55.690 | -3.841 |
| | Image-side surface 86 | 6.115 | 0.500 | | | |
| Filter 9 | Object-side surface 95 | Infinity | 0.210 | 1.517 | 64.167 | |
| | Image-side surface 96 | Infinity | 0.307 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 0.000000E+00 | 1.115373E-03 | -6.203133E-04 | 9.697297E-04 | -5.967358E-04 |
| 16 | 0.000000E+00 | -6.826458E-03 | 4.741443E-03 | -3.126991E-03 | 1.852840E-03 |
| 25 | 0.000000E+00 | -1.833958E-02 | 4.151934E-03 | -1.878589E-03 | 1.547037E-03 |
| 26 | 1.652886E+00 | -1.624484E-02 | 3.096236E-04 | -1.704958E-03 | 2.200118E-03 |
| 35 | 0.000000E+00 | 2.014628E-03 | -9.806521E-04 | 1.006646E-03 | -6.070027E-04 |
| 36 | 0.000000E+00 | -3.080368E-04 | -2.738791E-03 | 4.837569E-03 | -3.827659E-03 |
| 45 | 0.000000E+00 | -1.886307E-02 | -3.177958E-03 | -3.567348E-04 | 5.231835E-04 |
| 46 | 0.000000E+00 | -2.321377E-02 | -1.047812E-02 | 1.059487E-02 | -1.011794E-02 |
| 55 | 0.000000E+00 | -2.405517E-02 | -3.408375E-03 | 5.578881E-03 | -7.744081E-03 |
| 56 | 0.000000E+00 | -2.570121E-02 | 4.977760E-03 | -1.694147E-03 | -4.070095E-04 |
| 65 | 0.000000E+00 | -3.560136E-02 | 5.106900E-03 | 1.099732E-03 | -2.274291E-03 |
| 66 | 1.287023E+00 | -4.080907E-02 | 1.016740E-02 | -1.896516E-03 | -4.189888E-05 |
| 75 | 0.000000E+00 | -2.059875E-02 | 6.900657E-03 | -1.544124E-03 | 2.205948E-04 |
| 76 | -6.269418E-01 | 8.934759E-03 | 6.168271E-04 | -8.343765E-04 | 2.926302E-04 |
| 85 | -3.231357E+00 | -5.682731E-03 | -8.245419E-04 | 3.272915E-05 | 5.061898E-05 |
| 86 | 0.000000E+00 | -1.628482E-02 | 1.960624E-03 | -2.452702E-04 | 2.491784E-05 |
| Surface | $a_{12}$ | $a_{14}$ | $a_{16}$ | $a_{18}$ | $a_{20}$ |
| 15 | 2.084841E-04 | -3.721254E-05 | 2.821540E-06 | 0.000000E+00 | 0.000000E+00 |
| 16 | -6.352743E-04 | 1.137142E-04 | -8.050323E-06 | 0.000000E+00 | 0.000000E+00 |
| 25 | -6.594576E-04 | 1.337478E-04 | -1.039303E-05 | 0.000000E+00 | 0.000000E+00 |
| 26 | -1.197811E-03 | 3.286693E-04 | -3.598133E-05 | 0.000000E+00 | 0.000000E+00 |
| 35 | 3.505316E-04 | -5.155249E-05 | 1.316143E-06 | 0.000000E+00 | 0.000000E+00 |
| 36 | 1.845508E-03 | -4.507664E-04 | 4.601877E-05 | 0.000000E+00 | 0.000000E+00 |
| 45 | -2.808605E-04 | 8.635028E-05 | -7.270435E-06 | 0.000000E+00 | 0.000000E+00 |
| 46 | 5.236680E-03 | -1.276337E-03 | 1.215873E-04 | 0.000000E+00 | 0.000000E+00 |
| 55 | 4.287948E-03 | -1.038974E-03 | 9.159964E-05 | 0.000000E+00 | 0.000000E+00 |
| 56 | 3.930698E-04 | -9.373752E-05 | 7.210695E-06 | 0.000000E+00 | 0.000000E+00 |
| 65 | 1.185536E-03 | -3.390502E-04 | 5.838347E-05 | -5.794944E-06 | 2.541497E-07 |
| 66 | 1.125802E-04 | -2.564173E-05 | 2.752098E-06 | -1.480863E-07 | 3.225896E-09 |
| 75 | -1.699393E-05 | 2.756924E-07 | 5.097520E-08 | -3.377763E-09 | 6.406100E-11 |
| 76 | -4.891309E-05 | 4.523989E-06 | -2.401117E-07 | 6.901497E-09 | -8.364200E-11 |
| 85 | -8.387449E-06 | 6.067172E-07 | -2.342416E-08 | 4.738360E-10 | -3.970000E-12 |
| 86 | -1.839020E-06 | 9.027931E-08 | -2.731120E-09 | 4.575600E-11 | -3.250000E-13 |

FIG. 17

| Fourth embodiment | | | | | | |
|---|---|---|---|---|---|---|
| EFL =6.158 mm, HFOV=41.779°, system length=7.616 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.817 | | | |
| First lens element 1 | Object-side surface 15 | 2.618 | 0.893 | 1.545 | 55.987 | 6.598 |
| | Image-side surface 16 | 8.417 | 0.039 | | | |
| Second lens element 2 | Object-side surface 25 | 4.974 | 0.279 | 1.588 | 28.433 | -15.597 |
| | Image-side surface 26 | 3.165 | 0.193 | | | |
| Third lens element 3 | Object-side surface 35 | 5.969 | 0.481 | 1.533 | 56.325 | 19.561 |
| | Image-side surface 36 | 13.514 | 0.450 | | | |
| Fourth lens element 4 | Object-side surface 45 | -18.957 | 0.317 | 1.640 | 23.529 | -457.833 |
| | Image-side surface 46 | -20.391 | 0.076 | | | |
| Fifth lens element 5 | Object-side surface 55 | -24.845 | 0.475 | 1.640 | 23.529 | 184.883 |
| | Image-side surface 56 | -20.713 | 0.432 | | | |
| Sixth lens element 6 | Object-side surface 65 | 8.769 | 0.395 | 1.661 | 20.373 | -18.534 |
| | Image-side surface 66 | 5.038 | 0.121 | | | |
| Seventh lens element 7 | Object-side surface 75 | 12.233 | 1.073 | 1.535 | 55.690 | 4.693 |
| | Image-side surface 76 | -3.077 | 1.005 | | | |
| Eighth lens element 8 | Object-side surface 85 | -2.935 | 0.434 | 1.535 | 55.690 | -3.678 |
| | Image-side surface 86 | 6.357 | 0.500 | | | |
| Filter 9 | Object-side surface 95 | Infinity | 0.210 | 1.517 | 64.167 | |
| | Image-side surface 96 | Infinity | 0.244 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 0.000000E+00 | 9.588621E-04 | 3.405331E-04 | 1.664274E-04 | -2.732414E-04 |
| 16 | 0.000000E+00 | -6.018028E-03 | 2.150161E-03 | -2.727456E-06 | 1.430749E-04 |
| 25 | 0.000000E+00 | -2.085364E-02 | 1.927720E-03 | 2.307051E-03 | -1.336074E-03 |
| 26 | 1.666423E+00 | -1.906717E-02 | -5.354008E-04 | 1.136284E-03 | 3.676715E-04 |
| 35 | 0.000000E+00 | 2.102792E-03 | 6.635591E-04 | -6.855199E-04 | 1.503490E-03 |
| 36 | 0.000000E+00 | -2.516806E-03 | -1.198047E-04 | 1.315020E-03 | -1.438580E-03 |
| 45 | 0.000000E+00 | -2.326948E-02 | -2.994438E-03 | -1.121615E-03 | -5.713146E-04 |
| 46 | 0.000000E+00 | -2.626044E-02 | -1.860774E-02 | 2.514940E-02 | -2.836962E-02 |
| 55 | 0.000000E+00 | -2.584798E-02 | -1.748675E-02 | 2.707515E-02 | -3.057774E-02 |
| 56 | 0.000000E+00 | -2.639743E-02 | -2.374639E-04 | 1.853081E-03 | -2.883842E-03 |
| 65 | 0.000000E+00 | -4.258599E-02 | 5.066653E-03 | 2.761148E-03 | -4.464728E-03 |
| 66 | 1.339160E+00 | -5.193532E-02 | 1.051454E-02 | 7.161935E-04 | -2.106448E-03 |
| 75 | 0.000000E+00 | -2.270760E-02 | 3.386603E-03 | 1.357827E-03 | -8.050992E-04 |
| 76 | -6.741084E-01 | 1.259476E-02 | 1.969995E-05 | -1.540835E-03 | 7.595009E-04 |
| 85 | -2.742837E+00 | -6.735633E-03 | -1.902470E-03 | 1.108454E-04 | 1.260489E-04 |
| 86 | 0.000000E+00 | -1.820130E-02 | 2.243379E-03 | -2.828113E-04 | 2.627064E-05 |
| Surface | $a_{12}$ | $a_{14}$ | $a_{16}$ | $a_{18}$ | $a_{20}$ |
| 15 | 1.916605E-04 | -5.535297E-05 | 6.401385E-06 | 0.000000E+00 | 0.000000E+00 |
| 16 | -1.932830E-04 | 7.286690E-05 | -8.536790E-06 | 0.000000E+00 | 0.000000E+00 |
| 25 | 3.337699E-04 | -3.014283E-05 | -7.595591E-07 | 0.000000E+00 | 0.000000E+00 |
| 26 | -9.481301E-04 | 4.759599E-04 | -7.488426E-05 | 0.000000E+00 | 0.000000E+00 |
| 35 | -1.096976E-03 | 4.676655E-04 | -6.577744E-05 | 0.000000E+00 | 0.000000E+00 |
| 36 | 1.013901E-03 | -3.087298E-04 | 4.218288E-05 | 0.000000E+00 | 0.000000E+00 |
| 45 | 7.957211E-04 | -2.610971E-04 | 4.079693E-05 | 0.000000E+00 | 0.000000E+00 |
| 46 | 1.687300E-02 | -4.783791E-03 | 5.315729E-04 | 0.000000E+00 | 0.000000E+00 |
| 55 | 1.768342E-02 | -4.874305E-03 | 5.131928E-04 | 0.000000E+00 | 0.000000E+00 |
| 56 | 1.572367E-03 | -3.843527E-04 | 3.485248E-05 | 0.000000E+00 | 0.000000E+00 |
| 65 | 2.343884E-03 | -6.754158E-04 | 1.215444E-04 | -1.374734E-05 | 7.463987E-07 |
| 66 | 9.138983E-04 | -1.986941E-04 | 2.376778E-05 | -1.493998E-06 | 3.870686E-08 |
| 75 | 1.971252E-04 | -2.775957E-05 | 2.266874E-06 | -9.846282E-08 | 1.749375E-09 |
| 76 | -1.629588E-04 | 1.904628E-05 | -1.274356E-06 | 4.616755E-08 | -7.049820E-10 |
| 85 | -2.526584E-05 | 2.180181E-06 | -1.000365E-07 | 2.398746E-09 | -2.376800E-11 |
| 86 | -1.554352E-06 | 4.695836E-08 | -1.642490E-10 | -2.502000E-11 | 4.200000E-13 |

FIG. 21

| Fifth embodiment | | | | | | |
|---|---|---|---|---|---|---|
| EFL=6.721 mm, HFOV=39.605°, system length=8.318 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.865 | | | |
| First lens element 1 | Object-side surface 15 | 2.901 | 1.002 | 1.545 | 55.987 | 7.075 |
| | Image-side surface 16 | 10.218 | 0.062 | | | |
| Second lens element 2 | Object-side surface 25 | 5.612 | 0.299 | 1.671 | 19.243 | -15.064 |
| | Image-side surface 26 | 3.543 | 0.203 | | | |
| Third lens element 3 | Object-side surface 35 | 7.695 | 0.382 | 1.535 | 55.690 | 23.847 |
| | Image-side surface 36 | 18.941 | 0.510 | | | |
| Fourth lens element 4 | Object-side surface 45 | -20.320 | 0.246 | 1.640 | 23.529 | -114.947 |
| | Image-side surface 46 | -28.131 | 0.157 | | | |
| Fifth lens element 5 | Object-side surface 55 | -32.554 | 0.581 | 1.640 | 23.529 | 44.668 |
| | Image-side surface 56 | -15.386 | 0.760 | | | |
| Sixth lens element 6 | Object-side surface 65 | 9.764 | 0.380 | 1.661 | 20.373 | -19.278 |
| | Image-side surface 66 | 5.464 | 0.164 | | | |
| Seventh lens element 7 | Object-side surface 75 | 11.665 | 1.130 | 1.535 | 55.690 | 5.183 |
| | Image-side surface 76 | -3.532 | 1.235 | | | |
| Eighth lens element 8 | Object-side surface 85 | -3.298 | 0.200 | 1.535 | 55.690 | -3.950 |
| | Image-side surface 86 | 6.074 | 0.500 | | | |
| Filter 9 | Object-side surface 95 | Infinity | 0.210 | 1.517 | 64.167 | |
| | Image-side surface 96 | Infinity | 0.297 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 0.000000E+00 | 1.093214E-03 | 2.963290E-05 | 1.836942E-04 | -1.071995E-04 |
| 16 | 0.000000E+00 | -9.058929E-03 | 8.701908E-03 | -5.094371E-03 | 2.158109E-03 |
| 25 | 0.000000E+00 | -2.249478E-02 | 9.533142E-03 | -4.141996E-03 | 1.684080E-03 |
| 26 | 1.658219E+00 | -1.913460E-02 | 3.020300E-03 | -1.362211E-03 | 6.292115E-04 |
| 35 | 0.000000E+00 | 2.469047E-03 | -3.534677E-03 | 4.422506E-03 | -3.312753E-03 |
| 36 | 0.000000E+00 | -1.046802E-03 | -7.212271E-04 | 1.552725E-03 | -1.257427E-03 |
| 45 | 0.000000E+00 | -2.308655E-02 | 6.642994E-03 | -1.092928E-02 | 6.649971E-03 |
| 46 | 0.000000E+00 | -2.834089E-02 | 3.842315E-03 | -2.476361E-03 | -2.246433E-03 |
| 55 | 0.000000E+00 | -2.915058E-02 | 5.807193E-03 | -3.527730E-03 | -1.099543E-03 |
| 56 | 0.000000E+00 | -2.269669E-02 | 2.657044E-03 | -1.311664E-03 | 7.253280E-07 |
| 65 | 0.000000E+00 | -3.503653E-02 | 5.194261E-03 | -5.269618E-04 | -5.665862E-04 |
| 66 | 1.235094E+00 | -3.994759E-02 | 6.795665E-03 | -5.479855E-04 | -3.579575E-04 |
| 75 | 0.000000E+00 | -1.449004E-02 | 2.373636E-03 | -1.034718E-04 | -2.206560E-05 |
| 76 | -6.101025E-01 | 9.241269E-03 | -3.652488E-04 | -2.410607E-04 | 1.148838E-04 |
| 85 | -4.233963E+00 | -6.710560E-03 | -2.358350E-04 | 5.727357E-05 | 1.496230E-05 |
| 86 | 0.000000E+00 | -1.499985E-02 | 1.885238E-03 | -2.306936E-04 | 2.188987E-05 |
| Surface | $a_{12}$ | $a_{14}$ | $a_{16}$ | $a_{18}$ | $a_{20}$ |
| 15 | 4.306918E-05 | -8.385322E-06 | 7.439620E-07 | 0.000000E+00 | 0.000000E+00 |
| 16 | -5.633171E-04 | 8.241806E-05 | -5.085913E-06 | 0.000000E+00 | 0.000000E+00 |
| 25 | -4.477447E-04 | 6.522206E-05 | -3.943825E-06 | 0.000000E+00 | 0.000000E+00 |
| 26 | -2.445342E-04 | 7.764160E-05 | -1.167911E-05 | 0.000000E+00 | 0.000000E+00 |
| 35 | 1.497571E-03 | -2.999637E-04 | 2.219032E-05 | 0.000000E+00 | 0.000000E+00 |
| 36 | 7.084177E-04 | -1.701240E-04 | 1.615998E-05 | 0.000000E+00 | 0.000000E+00 |
| 45 | -2.336448E-03 | 4.592457E-04 | -3.608723E-05 | 0.000000E+00 | 0.000000E+00 |
| 46 | 2.166899E-03 | -6.272915E-04 | 6.640691E-05 | 0.000000E+00 | 0.000000E+00 |
| 55 | 1.323773E-03 | -3.598206E-04 | 3.137465E-05 | 0.000000E+00 | 0.000000E+00 |
| 56 | 1.351239E-04 | -3.464533E-05 | 2.488940E-06 | 0.000000E+00 | 0.000000E+00 |
| 65 | 3.006695E-04 | -7.060963E-05 | 9.871605E-06 | -8.776215E-07 | 3.769035E-08 |
| 66 | 1.655437E-04 | -3.188257E-05 | 3.212319E-06 | -1.660378E-07 | 3.488607E-09 |
| 75 | 4.863882E-06 | -5.372972E-07 | 3.390981E-08 | -1.082114E-09 | 1.320300E-11 |
| 76 | -1.947695E-05 | 1.690559E-06 | -8.104180E-08 | 2.030943E-09 | -2.033900E-11 |
| 85 | -2.738630E-06 | 1.873271E-07 | -6.603726E-09 | 1.202850E-10 | -9.010000E-13 |
| 86 | -1.467663E-06 | 6.502826E-08 | -1.782418E-09 | 2.716300E-11 | -1.760000E-13 |

FIG. 25

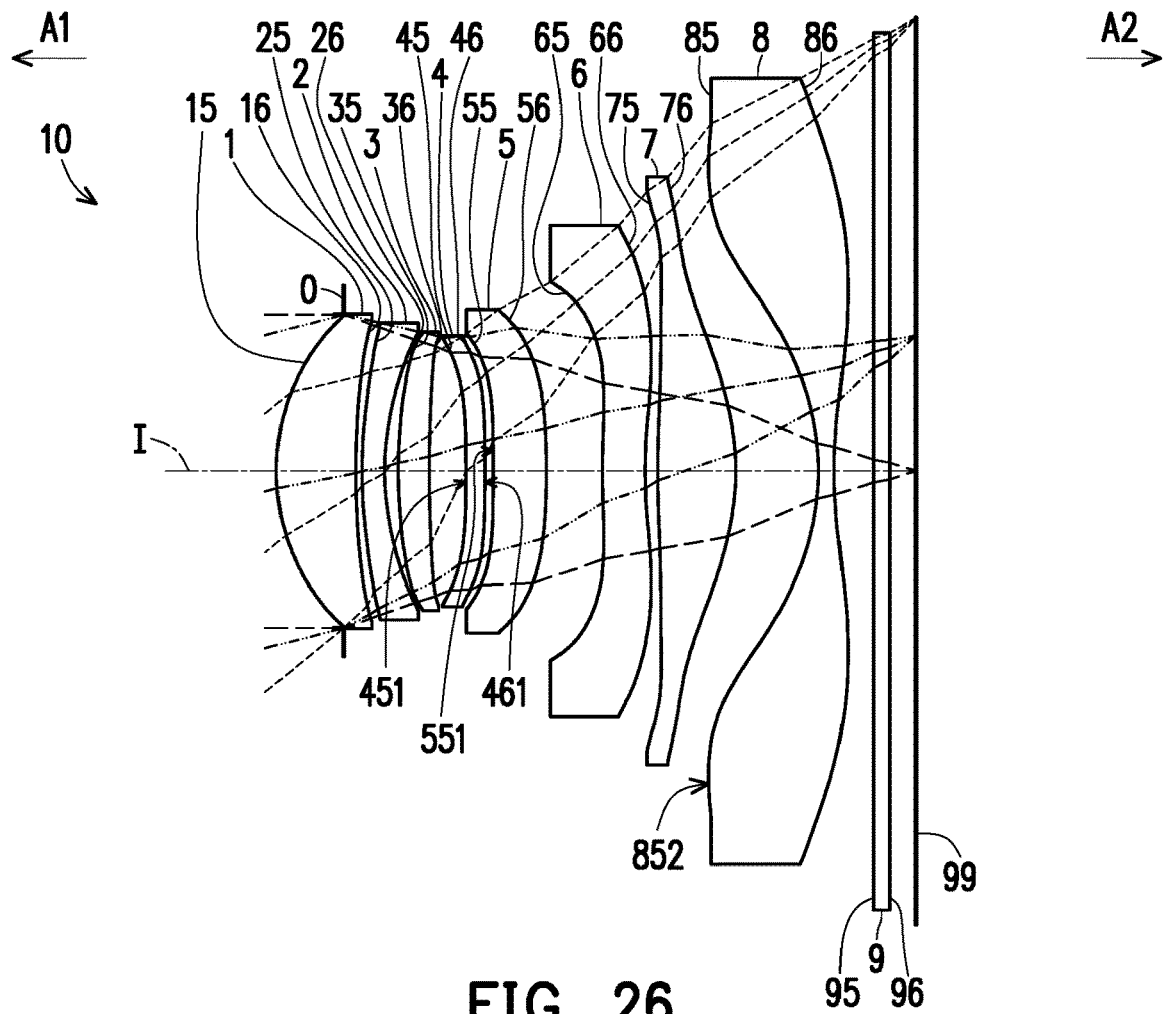
FIG. 26
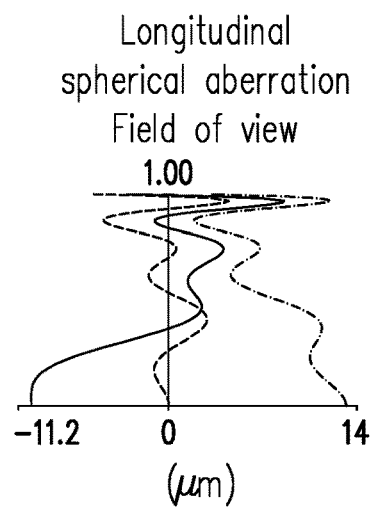
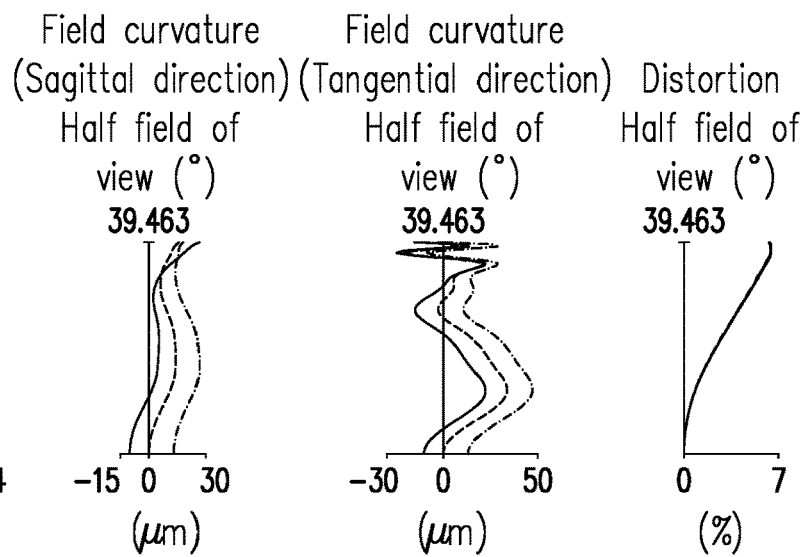
FIG. 27A   FIG. 27B   FIG. 27C   FIG. 27D

| Sixth embodiment | | | | | | |
|---|---|---|---|---|---|---|
| EFL =6.628 mm, HFOV=39.463°, system length=8.190 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.858 | | | |
| First lens element 1 | Object-side surface 15 | 2.837 | 1.013 | 1.545 | 55.987 | 6.914 |
| | Image-side surface 16 | 9.967 | 0.080 | | | |
| Second lens element 2 | Object-side surface 25 | 5.495 | 0.292 | 1.671 | 19.243 | -14.721 |
| | Image-side surface 26 | 3.467 | 0.174 | | | |
| Third lens element 3 | Object-side surface 35 | 7.225 | 0.399 | 1.535 | 55.690 | 21.282 |
| | Image-side surface 36 | 19.262 | 0.472 | | | |
| Fourth lens element 4 | Object-side surface 45 | -20.415 | 0.242 | 1.640 | 23.529 | -43.389 |
| | Image-side surface 46 | -75.951 | 0.107 | | | |
| Fifth lens element 5 | Object-side surface 55 | -51.715 | 0.681 | 1.640 | 23.529 | 25.348 |
| | Image-side surface 56 | -12.480 | 0.714 | | | |
| Sixth lens element 6 | Object-side surface 65 | 10.873 | 0.546 | 1.661 | 20.373 | -18.134 |
| | Image-side surface 66 | 5.611 | 0.163 | | | |
| Seventh lens element 7 | Object-side surface 75 | 12.180 | 1.000 | 1.535 | 55.690 | 5.039 |
| | Image-side surface 76 | -3.380 | 1.060 | | | |
| Eighth lens element 8 | Object-side surface 85 | -3.223 | 0.200 | 1.535 | 55.690 | -3.825 |
| | Image-side surface 86 | 5.786 | 0.500 | | | |
| Filter 9 | Object-side surface 95 | Infinity | 0.210 | 1.517 | 64.167 | |
| | Image-side surface 96 | Infinity | 0.336 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 0.000000E+00 | 1.434782E-03 | -7.515060E-04 | 8.605669E-04 | -4.522700E-04 |
| 16 | 0.000000E+00 | -8.870930E-03 | 8.511442E-03 | -5.553178E-03 | 2.759448E-03 |
| 25 | 0.000000E+00 | -2.246650E-02 | 8.267644E-03 | -3.444464E-03 | 1.805772E-03 |
| 26 | 1.657971E+00 | -1.915331E-02 | 1.753659E-03 | -8.035089E-04 | 7.037966E-04 |
| 35 | 0.000000E+00 | 3.805527E-03 | -5.122428E-03 | 5.829530E-03 | -4.431564E-03 |
| 36 | 0.000000E+00 | -9.943948E-04 | -1.325777E-03 | 1.925118E-03 | -1.443341E-03 |
| 45 | 0.000000E+00 | -2.647840E-02 | 1.390645E-02 | -2.000529E-02 | 1.247478E-02 |
| 46 | 0.000000E+00 | -3.586800E-02 | 1.646529E-02 | -1.280299E-02 | 3.739122E-04 |
| 55 | 0.000000E+00 | -3.427834E-02 | 1.487109E-02 | -8.950129E-03 | -1.298697E-03 |
| 56 | 0.000000E+00 | -2.457028E-02 | 3.683419E-03 | -1.156444E-03 | -2.973856E-04 |
| 65 | 0.000000E+00 | -3.360053E-02 | 4.622154E-03 | -3.181527E-04 | -9.216268E-04 |
| 66 | 1.291915E+00 | -3.805708E-02 | 8.209474E-03 | -1.445549E-03 | -5.345091E-05 |
| 75 | 0.000000E+00 | -1.986801E-02 | 6.111488E-03 | -1.341980E-03 | 2.032031E-04 |
| 76 | -6.382966E-01 | 9.511471E-03 | 3.435649E-04 | -7.564364E-04 | 2.939147E-04 |
| 85 | -3.845080E+00 | -5.765831E-03 | -1.192497E-03 | 1.734885E-04 | 2.786623E-05 |
| 86 | 0.000000E+00 | -1.729105E-02 | 2.040905E-03 | -2.373831E-04 | 2.286770E-05 |
| Surface | $a_{12}$ | $a_{14}$ | $a_{16}$ | $a_{18}$ | $a_{20}$ |
| 15 | 1.454629E-04 | -2.462327E-05 | 1.824450E-06 | 0.000000E+00 | 0.000000E+00 |
| 16 | -8.360754E-04 | 1.376177E-04 | -9.257590E-06 | 0.000000E+00 | 0.000000E+00 |
| 25 | -6.396273E-04 | 1.183375E-04 | -8.610458E-06 | 0.000000E+00 | 0.000000E+00 |
| 26 | -4.077884E-04 | 1.369984E-04 | -1.913325E-05 | 0.000000E+00 | 0.000000E+00 |
| 35 | 2.066719E-03 | -4.314755E-04 | 3.317886E-05 | 0.000000E+00 | 0.000000E+00 |
| 36 | 7.922827E-04 | -1.797681E-04 | 1.508004E-05 | 0.000000E+00 | 0.000000E+00 |
| 45 | -4.448128E-03 | 8.806554E-04 | -7.095267E-05 | 0.000000E+00 | 0.000000E+00 |
| 46 | 2.631384E-03 | -9.524519E-04 | 1.098231E-04 | 0.000000E+00 | 0.000000E+00 |
| 55 | 2.528338E-03 | -7.557596E-04 | 7.168795E-05 | 0.000000E+00 | 0.000000E+00 |
| 56 | 2.623648E-04 | -5.978610E-05 | 4.393577E-06 | 0.000000E+00 | 0.000000E+00 |
| 65 | 5.748660E-04 | -1.715155E-04 | 2.993001E-05 | -3.012376E-06 | 1.338328E-07 |
| 66 | 9.541169E-05 | -2.117975E-05 | 2.210166E-06 | -1.146325E-07 | 2.387917E-09 |
| 75 | -1.777768E-05 | 5.364598E-07 | 3.028476E-08 | -2.605524E-09 | 5.222900E-11 |
| 76 | -5.166853E-05 | 4.921248E-06 | -2.654549E-07 | 7.663914E-09 | -9.209100E-11 |
| 85 | -6.367844E-06 | 4.992155E-07 | -1.996923E-08 | 4.115690E-10 | -3.484000E-12 |
| 86 | -1.641767E-06 | 7.987528E-08 | -2.431285E-09 | 4.145500E-11 | -3.020000E-13 |

FIG. 29

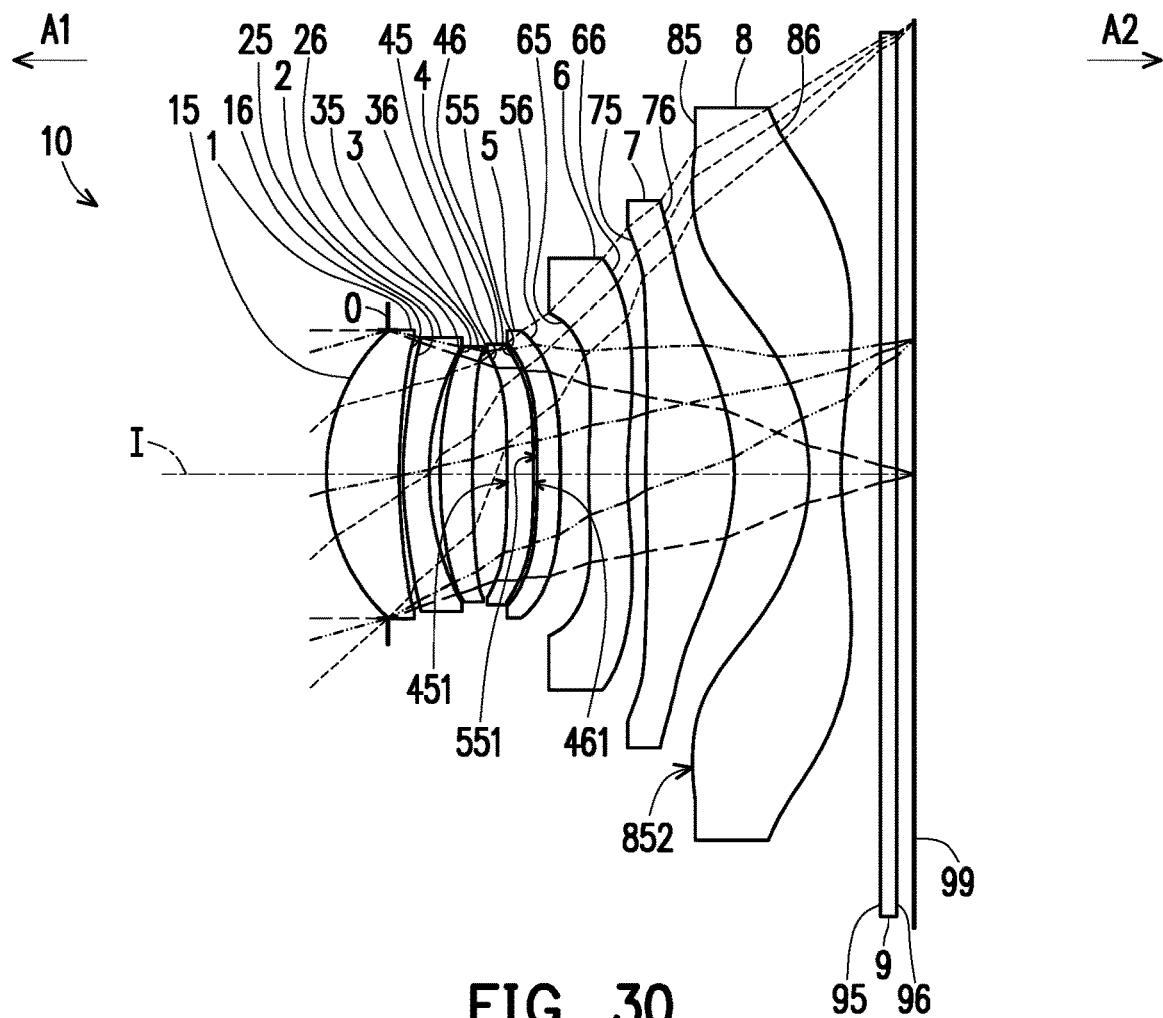
FIG. 30
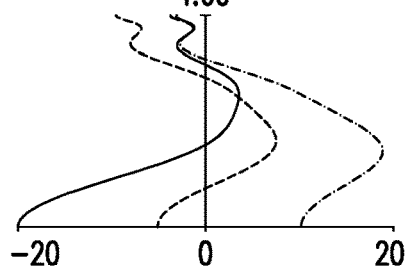
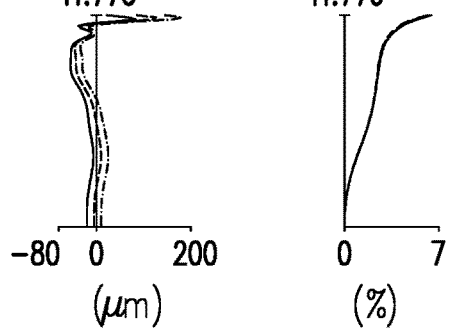
FIG. 31A   FIG. 31B   FIG. 31C   FIG. 31D

| Seventh embodiment ||||||
|---|---|---|---|---|---|
| EFL =6.101 mm, HFOV=11.776°, system length=7.548 mm, Fno=1.650, image height=5.800 mm ||||||
| Device | Surface | Radius of curvature (mm) | Distance (mm) | Refractive index | Abbe number | Focal length (mm) |
| Object | | | Infinity | | | |
| Aperture 0 | | Infinity | -0.790 | | | |
| First lens element 1 | Object-side surface 15 | 2.629 | 0.936 | 1.545 | 55.987 | 6.641 |
| | Image-side surface 16 | 8.343 | 0.050 | | | |
| Second lens element 2 | Object-side surface 25 | 4.890 | 0.334 | 1.671 | 19.243 | -14.704 |
| | Image-side surface 26 | 3.190 | 0.142 | | | |
| Third lens element 3 | Object-side surface 35 | 5.790 | 0.415 | 1.535 | 55.690 | 19.239 |
| | Image-side surface 36 | 12.838 | 0.449 | | | |
| Fourth lens element 4 | Object-side surface 45 | -23.321 | 0.336 | 1.640 | 23.529 | -1032.145 |
| | Image-side surface 46 | -24.304 | 0.049 | | | |
| Fifth lens element 5 | Object-side surface 55 | -19.641 | 0.293 | 1.640 | 23.529 | 149.996 |
| | Image-side surface 56 | -16.421 | 0.364 | | | |
| Sixth lens element 6 | Object-side surface 65 | 8.243 | 0.498 | 1.661 | 20.373 | -24.289 |
| | Image-side surface 66 | 5.331 | 0.235 | | | |
| Seventh lens element 7 | Object-side surface 75 | 13.903 | 1.140 | 1.535 | 55.690 | 4.740 |
| | Image-side surface 76 | -3.027 | 0.964 | | | |
| Eighth lens element 8 | Object-side surface 85 | -2.760 | 0.409 | 1.535 | 55.690 | -3.478 |
| | Image-side surface 86 | 6.081 | 0.500 | | | |
| Filter 9 | Object-side surface 95 | Infinity | 0.210 | 1.517 | 64.167 | |
| | Image-side surface 96 | Infinity | 0.225 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | 0.000000E+00 | 1.265675E-03 | 3.514997E-04 | 1.513220E-04 | -2.777583E-04 |
| 16 | 0.000000E+00 | -6.227598E-03 | 2.120339E-03 | 8.354560E-06 | 1.483450E-04 |
| 25 | 0.000000E+00 | -2.051199E-02 | 2.025494E-03 | 2.338569E-03 | -1.327391E-03 |
| 26 | 1.656394E+00 | -1.918442E-02 | -4.654286E-04 | 1.133334E-03 | 3.551080E-04 |
| 35 | 0.000000E+00 | 1.949870E-03 | 4.090929E-04 | -7.712788E-04 | 1.503322E-03 |
| 36 | 0.000000E+00 | -1.470555E-03 | 5.304986E-05 | 1.382377E-03 | -1.416455E-03 |
| 45 | 0.000000E+00 | -2.308505E-02 | -2.941428E-03 | -1.164529E-03 | -5.964116E-04 |
| 46 | 0.000000E+00 | -2.817968E-02 | -1.877585E-02 | 2.515750E-02 | -2.839415E-02 |
| 55 | 0.000000E+00 | -2.508780E-02 | -1.747876E-02 | 2.706211E-02 | -3.057598E-02 |
| 56 | 0.000000E+00 | -2.708382E-02 | -4.951262E-04 | 1.837151E-03 | -2.874052E-03 |
| 65 | 0.000000E+00 | -4.514282E-02 | 4.886228E-03 | 2.771489E-03 | -4.457613E-03 |
| 66 | 1.386837E+00 | -5.080212E-02 | 1.048851E-02 | 7.087694E-04 | -2.105842E-03 |
| 75 | 0.000000E+00 | -2.269115E-02 | 3.376184E-03 | 1.357199E-03 | -8.051444E-04 |
| 76 | -6.441915E-01 | 1.241122E-02 | 2.366785E-05 | -1.540902E-03 | 7.594931E-04 |
| 85 | -2.674155E+00 | -6.527034E-03 | -1.891564E-03 | 1.103074E-04 | 1.260187E-04 |
| 86 | 0.000000E+00 | -1.914139E-02 | 2.258570E-03 | -2.820863E-04 | 2.626351E-05 |
| Surface | $a_{12}$ | $a_{14}$ | $a_{16}$ | $a_{18}$ | $a_{20}$ |
| 15 | 1.911281E-04 | -5.540386E-05 | 6.393244E-06 | 0.000000E+00 | 0.000000E+00 |
| 16 | -1.929833E-04 | 7.317814E-05 | -8.429564E-06 | 0.000000E+00 | 0.000000E+00 |
| 25 | 3.343840E-04 | -3.013646E-05 | -8.594530E-07 | 0.000000E+00 | 0.000000E+00 |
| 26 | -9.551782E-04 | 4.715256E-04 | -7.417984E-05 | 0.000000E+00 | 0.000000E+00 |
| 35 | -1.094827E-03 | 4.690325E-04 | -6.588124E-05 | 0.000000E+00 | 0.000000E+00 |
| 36 | 1.023775E-03 | -3.067219E-04 | 4.399969E-05 | 0.000000E+00 | 0.000000E+00 |
| 45 | 7.874356E-04 | -2.645770E-04 | 3.949488E-05 | 0.000000E+00 | 0.000000E+00 |
| 46 | 1.686137E-02 | -4.783827E-03 | 5.309896E-04 | 0.000000E+00 | 0.000000E+00 |
| 55 | 1.767407E-02 | -4.869915E-03 | 5.130806E-04 | 0.000000E+00 | 0.000000E+00 |
| 56 | 1.566438E-03 | -3.870832E-04 | 3.446390E-05 | 0.000000E+00 | 0.000000E+00 |
| 65 | 2.347305E-03 | -6.755838E-04 | 1.213471E-04 | -1.381615E-05 | 7.291139E-07 |
| 66 | 9.140239E-04 | -1.987011E-04 | 2.376821E-05 | -1.494094E-06 | 3.868010E-08 |
| 75 | 1.971227E-04 | -2.775967E-05 | 2.266872E-06 | -9.846224E-08 | 1.749469E-09 |
| 76 | -1.629590E-04 | 1.904628E-05 | -1.274354E-06 | 4.616767E-08 | -7.049550E-10 |
| 85 | -2.526940E-05 | 2.180331E-06 | -1.000257E-07 | 2.398862E-09 | -2.378500E-11 |
| 86 | -1.554726E-06 | 4.694270E-08 | -1.645850E-10 | -2.498600E-11 | 4.210000E-13 |

FIG. 33

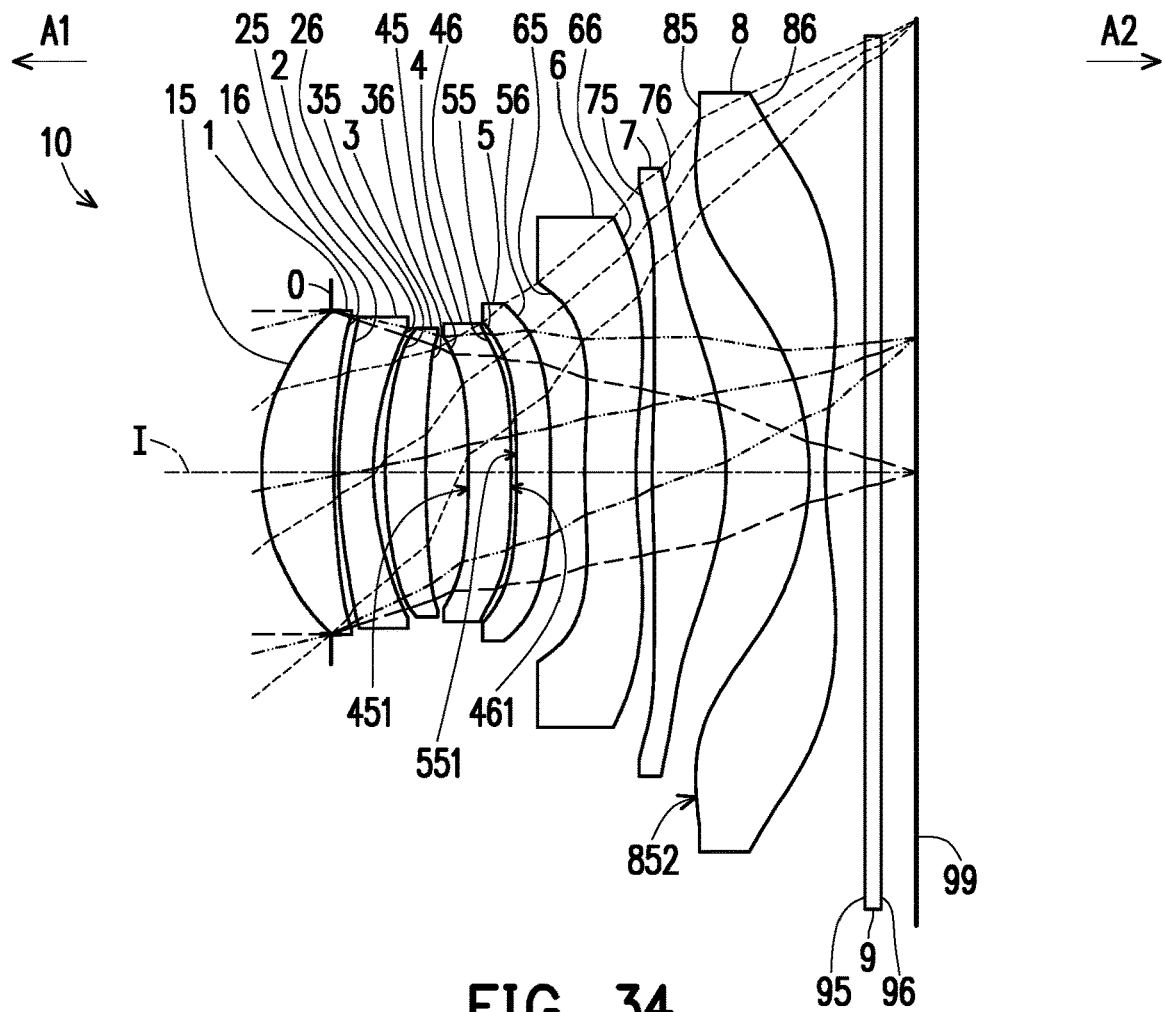
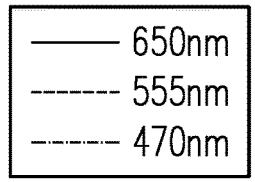
FIG. 34
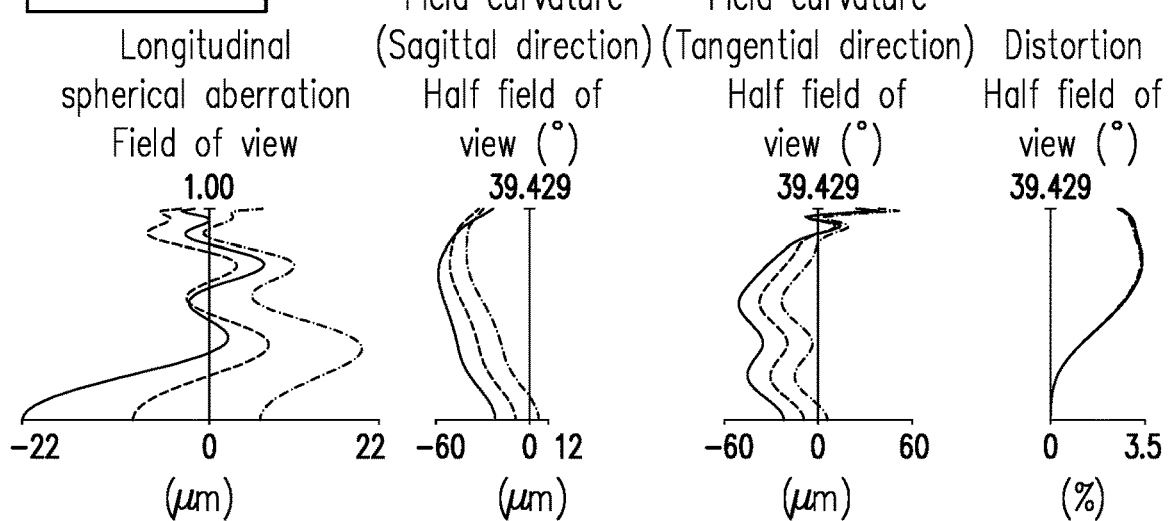
FIG. 35A   FIG. 35B   FIG. 35C   FIG. 35D

| Eighth embodiment | | | | | | |
|---|---|---|---|---|---|---|
| EFL=6.863 mm, HFOV=39.429°, system length=8.403 mm, Fno=1.650, image height=5.800 mm | | | | | | |
| Device | Surface | Radius of curvature (mm) | Distance (mm) | Refractive index | Abbe number | Focal length (mm) |
| Object | | | Infinity | | | |
| Aperture 0 | | Infinity | -0.883 | | | |
| First lens element 1 | Object-side surface 15 | 2.943 | 0.921 | 1.545 | 55.987 | 7.383 |
| | Image-side surface 16 | 9.684 | 0.064 | | | |
| Second lens element 2 | Object-side surface 25 | 5.599 | 0.445 | 1.671 | 19.243 | -16.416 |
| | Image-side surface 26 | 3.605 | 0.154 | | | |
| Third lens element 3 | Object-side surface 35 | 6.020 | 0.523 | 1.535 | 55.690 | 18.452 |
| | Image-side surface 36 | 14.872 | 0.546 | | | |
| Fourth lens element 4 | Object-side surface 45 | -16.374 | 0.550 | 1.640 | 23.529 | -93.463 |
| | Image-side surface 46 | -22.781 | 0.072 | | | |
| Fifth lens element 5 | Object-side surface 55 | -24.905 | 0.437 | 1.640 | 23.529 | 468.479 |
| | Image-side surface 56 | -23.166 | 0.434 | | | |
| Sixth lens element 6 | Object-side surface 65 | 9.021 | 0.656 | 1.661 | 20.373 | -29.111 |
| | Image-side surface 66 | 5.981 | 0.211 | | | |
| Seventh lens element 7 | Object-side surface 75 | 13.190 | 0.951 | 1.535 | 55.690 | 5.408 |
| | Image-side surface 76 | -3.631 | 1.070 | | | |
| Eighth lens element 8 | Object-side surface 85 | -3.576 | 0.208 | 1.535 | 55.690 | -4.172 |
| | Image-side surface 86 | 6.123 | 0.500 | | | |
| Filter 9 | Object-side surface 95 | Infinity | 0.210 | 1.517 | 64.167 | |
| | Image-side surface 96 | Infinity | 0.453 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | 0.000000E+00 | 1.806811E-03 | -1.896253E-03 | 1.939446E-03 | -1.040523E-03 |
| 16 | 0.000000E+00 | -8.595728E-03 | 8.732355E-03 | -6.454654E-03 | 3.146059E-03 |
| 25 | 0.000000E+00 | -1.858816E-02 | 1.044485E-02 | -7.628767E-03 | 3.894626E-03 |
| 26 | 1.592091E+00 | -1.494153E-02 | 1.208533E-03 | -2.105494E-03 | 1.613367E-03 |
| 35 | 0.000000E+00 | 4.073379E-04 | 5.505854E-04 | 2.782073E-04 | -5.638267E-04 |
| 36 | 0.000000E+00 | 1.166852E-03 | -5.885719E-03 | 8.834236E-03 | -6.641011E-03 |
| 45 | 0.000000E+00 | -1.663051E-02 | -5.474368E-03 | 2.070394E-03 | -7.914059E-04 |
| 46 | 0.000000E+00 | -2.118497E-02 | -3.067389E-03 | 1.169959E-03 | -2.935752E-03 |
| 55 | 0.000000E+00 | -2.368577E-02 | 7.127220E-03 | -4.913387E-03 | -4.792533E-04 |
| 56 | 0.000000E+00 | -2.839529E-02 | 9.398295E-03 | -3.815800E-03 | 6.377764E-04 |
| 65 | 0.000000E+00 | -3.032979E-02 | 1.316809E-03 | 3.705885E-03 | -3.565489E-03 |
| 66 | 1.335959E+00 | -3.452567E-02 | 9.719292E-03 | -2.680775E-03 | 4.497451E-04 |
| 75 | 0.000000E+00 | -2.130358E-02 | 7.632773E-03 | -2.053892E-03 | 3.887041E-04 |
| 76 | -6.235034E-01 | 9.800533E-03 | 7.740958E-04 | -1.040191E-03 | 3.515055E-04 |
| 85 | -3.064173E+00 | -2.066083E-03 | -2.924176E-03 | 5.724889E-04 | -2.984125E-05 |
| 86 | 0.000000E+00 | -1.708463E-02 | 1.423288E-03 | -8.098531E-05 | -5.843032E-07 |
| Surface | $a_{12}$ | $a_{14}$ | $a_{16}$ | $a_{18}$ | $a_{20}$ |
| 15 | 3.171680E-04 | -5.073832E-05 | 3.409225E-06 | 0.000000E+00 | 0.000000E+00 |
| 16 | -8.821590E-04 | 1.310459E-04 | -7.828770E-06 | 0.000000E+00 | 0.000000E+00 |
| 25 | -1.146884E-03 | 1.791712E-04 | -1.144450E-05 | 0.000000E+00 | 0.000000E+00 |
| 26 | -6.986755E-04 | 1.714511E-04 | -1.768843E-05 | 0.000000E+00 | 0.000000E+00 |
| 35 | 4.108047E-04 | -8.977978E-05 | 7.359477E-06 | 0.000000E+00 | 0.000000E+00 |
| 36 | 2.919920E-03 | -6.664342E-04 | 6.292082E-05 | 0.000000E+00 | 0.000000E+00 |
| 45 | 1.763637E-04 | -1.483529E-05 | 1.353867E-06 | 0.000000E+00 | 0.000000E+00 |
| 46 | 2.035104E-03 | -5.347643E-04 | 5.132288E-05 | 0.000000E+00 | 0.000000E+00 |
| 55 | 1.218486E-03 | -3.628835E-04 | 3.355514E-05 | 0.000000E+00 | 0.000000E+00 |
| 56 | 1.325662E-05 | -2.131362E-05 | 2.017709E-06 | 0.000000E+00 | 0.000000E+00 |
| 65 | 1.633022E-03 | -4.442256E-04 | 7.349384E-05 | -6.908485E-06 | 2.830975E-07 |
| 66 | -3.362489E-05 | -9.402522E-07 | 3.577024E-07 | -2.398548E-08 | 5.520410E-10 |
| 75 | -4.789613E-05 | 3.668476E-06 | -1.690745E-07 | 4.358584E-09 | -4.923500E-11 |
| 76 | -5.782393E-05 | 5.316313E-06 | -2.812253E-07 | 8.045633E-09 | -9.677000E-11 |
| 85 | -1.013039E-06 | 1.857170E-07 | -8.800920E-09 | 1.903890E-10 | -1.615000E-12 |
| 86 | 6.036375E-07 | -5.893221E-08 | 2.867680E-09 | -7.039900E-11 | 6.860000E-13 |

FIG. 37

| Ninth embodiment ||||||
|---|---|---|---|---|---|
| EFL =6.719 mm, HFOV=39.545°, system length=8.358 mm, Fno=1.650, image height=5.800 mm ||||||
| Device | Surface | Radius of curvature (mm) | Distance (mm) | Refractive index | Abbe number | Focal length (mm) |
| Object | | | Infinity | | | |
| Aperture 0 | | Infinity | -0.762 | | | |
| First lens element 1 | Object-side surface 15 | 2.991 | 0.847 | 1.545 | 55.987 | 7.788 |
| | Image-side surface 16 | 9.063 | 0.051 | | | |
| Second lens element 2 | Object-side surface 25 | 5.316 | 0.280 | 1.671 | 19.243 | -17.357 |
| | Image-side surface 26 | 3.583 | 0.146 | | | |
| Third lens element 3 | Object-side surface 35 | 5.749 | 0.641 | 1.535 | 55.690 | 20.352 |
| | Image-side surface 36 | 11.653 | 0.546 | | | |
| Fourth lens element 4 | Object-side surface 45 | -41.658 | 0.456 | 1.640 | 23.529 | -80.245 |
| | Image-side surface 46 | -214.955 | 0.131 | | | |
| Fifth lens element 5 | Object-side surface 55 | -242.489 | 0.606 | 1.640 | 23.529 | 24.780 |
| | Image-side surface 56 | -15.000 | 0.741 | | | |
| Sixth lens element 6 | Object-side surface 65 | 13.786 | 0.482 | 1.661 | 20.373 | -17.064 |
| | Image-side surface 66 | 6.148 | 0.076 | | | |
| Seventh lens element 7 | Object-side surface 75 | 12.219 | 1.000 | 1.535 | 55.690 | 5.428 |
| | Image-side surface 76 | -3.720 | 1.087 | | | |
| Eighth lens element 8 | Object-side surface 85 | -3.512 | 0.212 | 1.535 | 55.690 | -4.049 |
| | Image-side surface 86 | 5.833 | 0.500 | | | |
| Filter 9 | Object-side surface 95 | Infinity | 0.210 | 1.517 | 64.167 | |
| | Image-side surface 96 | Infinity | 0.346 | | | |
| | Image plane 99 | Infinity | | | | |

FIG. 40

| Surface | K | $a_4$ | $a_6$ | $a_8$ | $a_{10}$ |
|---|---|---|---|---|---|
| 15 | 0.000000E+00 | 1.072452E-03 | -1.422257E-03 | 1.387817E-03 | -7.128454E-04 |
| 16 | 0.000000E+00 | -8.047556E-03 | 7.276932E-03 | -4.896573E-03 | 2.270063E-03 |
| 25 | 0.000000E+00 | -1.826045E-02 | 8.993706E-03 | -6.612351E-03 | 3.490388E-03 |
| 26 | 1.623317E+00 | -1.418184E-02 | 3.491989E-03 | -5.558551E-03 | 3.500382E-03 |
| 35 | 0.000000E+00 | 1.310530E-03 | 4.659759E-03 | -5.494792E-03 | 2.789534E-03 |
| 36 | 0.000000E+00 | -3.142151E-04 | -1.422149E-03 | 1.962049E-03 | -1.565136E-03 |
| 45 | 0.000000E+00 | -1.630198E-02 | -2.089163E-03 | -2.085521E-04 | -2.569909E-04 |
| 46 | 0.000000E+00 | -2.475357E-02 | 3.031867E-03 | -8.787584E-04 | -2.547803E-03 |
| 55 | 0.000000E+00 | -2.645749E-02 | 5.343301E-03 | 1.807320E-04 | -3.851137E-03 |
| 56 | 0.000000E+00 | -2.167444E-02 | 2.942665E-03 | -9.707248E-05 | -7.256764E-04 |
| 65 | 0.000000E+00 | -2.558140E-02 | -1.774708E-03 | 4.165919E-03 | -2.966629E-03 |
| 66 | 1.336123E+00 | -3.040026E-02 | 4.942688E-03 | -5.754375E-04 | -7.564826E-05 |
| 75 | 0.000000E+00 | -1.677931E-02 | 4.781078E-03 | -1.074435E-03 | 1.847424E-04 |
| 76 | -5.645282E-01 | 8.537918E-03 | 7.568211E-04 | -9.901077E-04 | 3.289890E-04 |
| 85 | -2.919576E+00 | -3.638718E-03 | -1.842104E-03 | 2.728229E-04 | 1.434777E-05 |
| 86 | 0.000000E+00 | -1.672192E-02 | 1.833593E-03 | -2.007243E-04 | 1.889814E-05 |
| Surface | $a_{12}$ | $a_{14}$ | $a_{16}$ | $a_{18}$ | $a_{20}$ |
| 15 | 2.105454E-04 | -3.360131E-05 | 2.306618E-06 | 0.000000E+00 | 0.000000E+00 |
| 16 | -6.105884E-04 | 8.686761E-05 | -4.836705E-06 | 0.000000E+00 | 0.000000E+00 |
| 25 | -1.025053E-03 | 1.553832E-04 | -9.414096E-06 | 0.000000E+00 | 0.000000E+00 |
| 26 | -1.085884E-03 | 1.755861E-04 | -1.256005E-05 | 0.000000E+00 | 0.000000E+00 |
| 35 | -5.943770E-04 | 6.030176E-05 | -2.000379E-06 | 0.000000E+00 | 0.000000E+00 |
| 36 | 7.924693E-04 | -1.964671E-04 | 2.052908E-05 | 0.000000E+00 | 0.000000E+00 |
| 45 | 2.100277E-04 | -4.202241E-05 | 3.948482E-06 | 0.000000E+00 | 0.000000E+00 |
| 46 | 1.770707E-03 | -4.264082E-04 | 3.734316E-05 | 0.000000E+00 | 0.000000E+00 |
| 55 | 2.174138E-03 | -4.795358E-04 | 3.781602E-05 | 0.000000E+00 | 0.000000E+00 |
| 56 | 3.265740E-04 | -6.038790E-05 | 4.034846E-06 | 0.000000E+00 | 0.000000E+00 |
| 65 | 1.191144E-03 | -2.922992E-04 | 4.377989E-05 | -3.720366E-06 | 1.371898E-07 |
| 66 | 4.891602E-05 | -9.145195E-06 | 8.486441E-07 | -3.964741E-08 | 7.457320E-10 |
| 75 | -2.140683E-05 | 1.528671E-06 | -6.445517E-08 | 1.496987E-09 | -1.517700E-11 |
| 76 | -5.275341E-05 | 4.728663E-06 | -2.443815E-07 | 6.841240E-09 | -8.056300E-11 |
| 85 | -4.887057E-06 | 3.958297E-07 | -1.576914E-08 | 3.205910E-10 | -2.668000E-12 |
| 86 | -1.354109E-06 | 6.514406E-08 | -1.931648E-09 | 3.176600E-11 | -2.220000E-13 |

FIG. 41

| Tenth embodiment |||||||
|---|---|---|---|---|---|---|
| | EFL =6.191 mm, HFOV=41.990°, system length=7.524 mm, Fno=1.650, image height=5.800 mm |||||||
| Device | Surface | Radius of curvature (mm) | Distance (mm) | Refractive index | Abbe number | Focal length (mm) |
| Object | | | Infinity | | | |
| Aperture 0 | | Infinity | -0.829 | | | |
| First lens element 1 | Object-side surface 15 | 2.606 | 0.916 | 1.545 | 55.987 | 6.033 |
| | Image-side surface 16 | 10.906 | 0.045 | | | |
| Second lens element 2 | Object-side surface 25 | 4.498 | 0.220 | 1.671 | 19.243 | -19.785 |
| | Image-side surface 26 | 3.302 | 0.208 | | | |
| Third lens element 3 | Object-side surface 35 | 8.200 | 0.277 | 1.535 | 55.690 | -1208.954 |
| | Image-side surface 36 | 8.002 | 0.442 | | | |
| Fourth lens element 4 | Object-side surface 45 | -19.344 | 0.312 | 1.640 | 23.529 | 937.481 |
| | Image-side surface 46 | -18.863 | 0.045 | | | |
| Fifth lens element 5 | Object-side surface 55 | 103.684 | 0.407 | 1.640 | 23.529 | 52.308 |
| | Image-side surface 56 | -49.889 | 0.585 | | | |
| Sixth lens element 6 | Object-side surface 65 | 8.743 | 0.364 | 1.661 | 20.373 | -18.482 |
| | Image-side surface 66 | 5.030 | 0.154 | | | |
| Seventh lens element 7 | Object-side surface 75 | 10.753 | 1.032 | 1.535 | 55.690 | 4.534 |
| | Image-side surface 76 | -3.039 | 0.968 | | | |
| Eighth lens element 8 | Object-side surface 85 | -3.023 | 0.436 | 1.535 | 55.690 | -3.824 |
| | Image-side surface 86 | 6.708 | 0.500 | | | |
| Filter 9 | Object-side surface 95 | Infinity | 0.210 | 1.517 | 64.167 | |
| | Image-side surface 96 | Infinity | 0.404 | | | |
| | Image plane 99 | Infinity | | | | |

FIG. 44

| Surface | K | $a_4$ | $a_6$ | $a_8$ | $a_{10}$ |
|---|---|---|---|---|---|
| 15 | 0.000000E+00 | 1.228887E-03 | 3.666230E-04 | 2.037528E-04 | -2.842631E-04 |
| 16 | 0.000000E+00 | -6.440006E-03 | 2.149432E-03 | -1.756755E-05 | 1.361194E-04 |
| 25 | 0.000000E+00 | -2.067436E-02 | 2.032294E-03 | 2.414051E-03 | -1.280950E-03 |
| 26 | 1.820951E+00 | -1.856486E-02 | -2.724893E-04 | 1.153250E-03 | 4.504326E-04 |
| 35 | 0.000000E+00 | 8.658728E-05 | 6.794496E-04 | -5.329042E-04 | 1.540203E-03 |
| 36 | 0.000000E+00 | -2.682597E-03 | 9.782196E-04 | 1.543937E-03 | -1.324903E-03 |
| 45 | 0.000000E+00 | -1.867837E-02 | -2.580812E-03 | -1.544359E-03 | -6.760944E-04 |
| 46 | 0.000000E+00 | -2.407592E-02 | -1.802854E-02 | 2.530254E-02 | -2.835802E-02 |
| 55 | 0.000000E+00 | -2.840699E-02 | -1.774077E-02 | 2.751264E-02 | -3.043393E-02 |
| 56 | 0.000000E+00 | -2.629475E-02 | -1.105093E-03 | 1.693300E-03 | -2.889210E-03 |
| 65 | 0.000000E+00 | -4.166967E-02 | 5.021502E-03 | 2.695688E-03 | -4.469927E-03 |
| 66 | 1.230242E+00 | -5.253663E-02 | 1.047229E-02 | 7.163913E-04 | -2.106550E-03 |
| 75 | 0.000000E+00 | -2.300378E-02 | 3.343288E-03 | 1.355701E-03 | -8.051792E-04 |
| 76 | -6.521590E-01 | 1.233709E-02 | 1.895155E-05 | -1.541488E-03 | 7.594776E-04 |
| 85 | -2.649184E+00 | -6.732312E-03 | -1.898623E-03 | 1.101809E-04 | 1.260181E-04 |
| 86 | 0.000000E+00 | -1.904871E-02 | 2.226003E-03 | -2.821730E-04 | 2.628229E-05 |
| Surface | $a_{12}$ | $a_{14}$ | $a_{16}$ | $a_{18}$ | $a_{20}$ |
| 15 | 1.854994E-04 | -5.513851E-05 | 6.388839E-06 | 0.000000E+00 | 0.000000E+00 |
| 16 | -1.992482E-04 | 7.220962E-05 | -8.119473E-06 | 0.000000E+00 | 0.000000E+00 |
| 25 | 3.416153E-04 | -3.064380E-05 | -2.379100E-06 | 0.000000E+00 | 0.000000E+00 |
| 26 | -9.229497E-04 | 4.774723E-04 | -7.085490E-05 | 0.000000E+00 | 0.000000E+00 |
| 35 | -1.087851E-03 | 4.760802E-04 | -6.563341E-05 | 0.000000E+00 | 0.000000E+00 |
| 36 | 1.022881E-03 | -3.138294E-04 | 3.789582E-05 | 0.000000E+00 | 0.000000E+00 |
| 45 | 8.923052E-04 | -1.992520E-04 | 2.600969E-05 | 0.000000E+00 | 0.000000E+00 |
| 46 | 1.686516E-02 | -4.778963E-03 | 5.348623E-04 | 0.000000E+00 | 0.000000E+00 |
| 55 | 1.759957E-02 | -4.904746E-03 | 5.203285E-04 | 0.000000E+00 | 0.000000E+00 |
| 56 | 1.577629E-03 | -3.848155E-04 | 3.337926E-05 | 0.000000E+00 | 0.000000E+00 |
| 65 | 2.343620E-03 | -6.752508E-04 | 1.215956E-04 | -1.374170E-05 | 7.465929E-07 |
| 66 | 9.139132E-04 | -1.986905E-04 | 2.376804E-05 | -1.493702E-06 | 3.872151E-08 |
| 75 | 1.971240E-04 | -2.775961E-05 | 2.266887E-06 | -9.846129E-08 | 1.749541E-09 |
| 76 | -1.629554E-04 | 1.904669E-05 | -1.274337E-06 | 4.616588E-08 | -7.053700E-10 |
| 85 | -2.526932E-05 | 2.180319E-06 | -1.000261E-07 | 2.398888E-09 | -2.378300E-11 |
| 86 | -1.554691E-06 | 4.693594E-08 | -1.650000E-10 | -2.500900E-11 | 4.210000E-13 |

FIG. 45

| Condition | First embodiment | Second embodiment | Third embodiment | Fourth embodiment | Fifth embodiment |
|---|---|---|---|---|---|
| EFL | 6.564 | 6.863 | 6.605 | 6.158 | 6.721 |
| Fno | 1.650 | 1.650 | 1.650 | 1.650 | 1.650 |
| HFOV | 41.993 | 39.228 | 39.493 | 41.779 | 39.605 |
| ImgH | 5.800 | 5.800 | 5.800 | 5.800 | 5.800 |
| T1 | 1.123 | 0.910 | 1.007 | 0.893 | 1.002 |
| G12 | 0.158 | 0.041 | 0.048 | 0.039 | 0.062 |
| T2 | 0.243 | 0.389 | 0.293 | 0.279 | 0.299 |
| G23 | 0.055 | 0.141 | 0.138 | 0.193 | 0.203 |
| T3 | 0.280 | 0.572 | 0.452 | 0.481 | 0.382 |
| G34 | 0.300 | 0.524 | 0.544 | 0.450 | 0.510 |
| T4 | 0.293 | 0.543 | 0.452 | 0.317 | 0.246 |
| G45 | 0.082 | 0.230 | 0.129 | 0.076 | 0.157 |
| T5 | 0.376 | 0.720 | 0.465 | 0.475 | 0.581 |
| G56 | 0.667 | 0.594 | 0.518 | 0.432 | 0.760 |
| T6 | 0.289 | 0.256 | 0.498 | 0.395 | 0.380 |
| G67 | 0.071 | 0.064 | 0.178 | 0.121 | 0.164 |
| T7 | 1.953 | 0.987 | 1.099 | 1.073 | 1.130 |
| G78 | 0.835 | 1.098 | 1.062 | 1.005 | 1.235 |
| T8 | 0.617 | 0.202 | 0.280 | 0.434 | 0.200 |
| G8F | 0.500 | 0.500 | 0.500 | 0.500 | 0.500 |
| TF | 0.210 | 0.210 | 0.210 | 0.210 | 0.210 |
| GFP | 0.263 | 0.405 | 0.307 | 0.244 | 0.297 |
| V1 | 55.987 | 55.987 | 55.987 | 55.987 | 55.987 |
| V2 | 19.243 | 19.243 | 19.243 | 28.433 | 19.243 |
| V3 | 25.920 | 55.690 | 55.690 | 56.325 | 55.690 |
| V4 | 19.243 | 23.529 | 49.922 | 23.529 | 23.529 |
| V5 | 19.243 | 23.529 | 19.243 | 23.529 | 23.529 |
| V6 | 19.243 | 20.373 | 30.186 | 20.373 | 20.373 |
| V7 | 55.690 | 55.690 | 55.690 | 55.690 | 55.690 |
| V8 | 55.690 | 55.690 | 55.690 | 55.690 | 55.690 |

FIG. 46

| Condition | Sixth embodiment | Seventh embodiment | Eighth embodiment | Ninth embodiment | Tenth embodiment |
|---|---|---|---|---|---|
| EFL | 6.628 | 6.101 | 6.863 | 6.719 | 6.191 |
| Fno | 1.650 | 1.650 | 1.650 | 1.650 | 1.650 |
| HFOV | 39.463 | 41.776 | 39.429 | 39.545 | 41.990 |
| ImgH | 5.800 | 5.800 | 5.800 | 5.800 | 5.800 |
| T1 | 1.013 | 0.936 | 0.921 | 0.847 | 0.916 |
| G12 | 0.080 | 0.050 | 0.064 | 0.051 | 0.045 |
| T2 | 0.292 | 0.334 | 0.445 | 0.280 | 0.220 |
| G23 | 0.174 | 0.142 | 0.154 | 0.146 | 0.208 |
| T3 | 0.399 | 0.415 | 0.523 | 0.641 | 0.277 |
| G34 | 0.472 | 0.449 | 0.546 | 0.546 | 0.442 |
| T4 | 0.242 | 0.336 | 0.550 | 0.456 | 0.312 |
| G45 | 0.107 | 0.049 | 0.072 | 0.131 | 0.045 |
| T5 | 0.681 | 0.293 | 0.437 | 0.606 | 0.407 |
| G56 | 0.714 | 0.364 | 0.434 | 0.741 | 0.585 |
| T6 | 0.546 | 0.498 | 0.656 | 0.482 | 0.364 |
| G67 | 0.163 | 0.235 | 0.211 | 0.076 | 0.154 |
| T7 | 1.000 | 1.140 | 0.951 | 1.000 | 1.032 |
| G78 | 1.060 | 0.964 | 1.070 | 1.087 | 0.968 |
| T8 | 0.200 | 0.409 | 0.208 | 0.212 | 0.436 |
| G8F | 0.500 | 0.500 | 0.500 | 0.500 | 0.500 |
| TF | 0.210 | 0.210 | 0.210 | 0.210 | 0.210 |
| GFP | 0.336 | 0.225 | 0.453 | 0.346 | 0.404 |
| V1 | 55.987 | 55.987 | 55.987 | 55.987 | 55.987 |
| V2 | 19.243 | 19.243 | 19.243 | 19.243 | 19.243 |
| V3 | 55.690 | 55.690 | 55.690 | 55.690 | 55.690 |
| V4 | 23.529 | 23.529 | 23.529 | 23.529 | 23.529 |
| V5 | 23.529 | 23.529 | 23.529 | 23.529 | 23.529 |
| V6 | 20.373 | 20.373 | 20.373 | 20.373 | 20.373 |
| V7 | 55.690 | 55.690 | 55.690 | 55.690 | 55.690 |
| V8 | 55.690 | 55.690 | 55.690 | 55.690 | 55.690 |

FIG. 47

| Condition | First embodiment | Second embodiment | Third embodiment | Fourth embodiment | Fifth embodiment |
|---|---|---|---|---|---|
| ALT | 5.174 | 4.580 | 4.547 | 4.347 | 4.222 |
| AAG | 2.168 | 2.692 | 2.618 | 2.314 | 3.090 |
| TTL | 8.316 | 8.386 | 8.182 | 7.616 | 8.318 |
| TL | 7.343 | 7.272 | 7.165 | 6.661 | 7.312 |
| BFL | 0.973 | 1.115 | 1.017 | 0.954 | 1.007 |
| ImgH/(D12t32+D41t52) | 3.900 | 2.200 | 2.931 | 3.120 | 3.005 |
| V4+V5 | 38.486 | 47.058 | 69.165 | 47.058 | 47.058 |
| V5+V6 | 38.486 | 43.902 | 49.429 | 43.902 | 43.902 |
| V2+V3 | 45.163 | 74.933 | 74.933 | 84.758 | 74.933 |
| V4/V5 | 1.000 | 1.000 | 2.594 | 1.000 | 1.000 |
| V5/V6 | 1.000 | 1.155 | 0.637 | 1.155 | 1.155 |
| V3/V7 | 0.465 | 1.000 | 1.000 | 1.011 | 1.000 |
| ALT/G78 | 6.200 | 4.172 | 4.284 | 4.326 | 3.419 |
| (TTL+TL)/ImgH | 2.700 | 2.700 | 2.646 | 2.462 | 2.695 |
| (AAG+BFL)/D31t42 | 3.598 | 2.322 | 2.510 | 2.620 | 3.600 |
| EFL/(T1+T7+G78+T8) | 1.450 | 2.147 | 1.916 | 1.808 | 1.884 |
| D42t71/(T2+G23) | 5.000 | 3.518 | 4.143 | 3.176 | 4.069 |
| (G12+D42t71+BFL)/D31t42 | 2.998 | 1.843 | 1.971 | 1.997 | 2.734 |
| (G12+T2+G23+T3)/T4 | 2.507 | 2.105 | 2.063 | 3.121 | 3.846 |
| (T4+G45+T6+G67)/(G23+T3) | 2.200 | 1.533 | 2.130 | 1.350 | 1.618 |
| D12t51/(T5+G56) | 1.352 | 1.856 | 2.093 | 2.022 | 1.386 |
| (T6+G67+T8)/(T2+G34) | 1.800 | 0.571 | 1.142 | 1.304 | 0.920 |
| (G12+T2+T6+G67)/(T5+G56) | 0.729 | 0.571 | 1.036 | 0.919 | 0.675 |
| (G12+T2+T4+G45+T6+G67)/T7 | 0.582 | 1.543 | 1.455 | 1.143 | 1.157 |
| D41t61/(G23+G34) | 4.000 | 3.140 | 2.293 | 2.025 | 2.447 |
| (T3+D41t71)/T1 | 1.833 | 3.272 | 2.674 | 2.570 | 2.664 |
| (D41t71+BFL)/G78 | 3.298 | 3.208 | 3.069 | 2.757 | 2.668 |
| (T2+T3+AAG)/T7 | 1.377 | 3.700 | 3.060 | 2.865 | 3.336 |
| TTL/(T1+G12+T7+G78) | 2.043 | 2.762 | 2.544 | 2.530 | 2.425 |

FIG. 48

| Condition | Sixth embodiment | Seventh embodiment | Eighth embodiment | Ninth embodiment | Tenth embodiment |
|---|---|---|---|---|---|
| ALT | 4.374 | 4.361 | 4.690 | 4.525 | 3.963 |
| AAG | 2.770 | 2.253 | 2.550 | 2.777 | 2.447 |
| TTL | 8.190 | 7.548 | 8.403 | 8.358 | 7.524 |
| TL | 7.144 | 6.613 | 7.239 | 7.302 | 6.410 |
| BFL | 1.046 | 0.935 | 1.163 | 1.056 | 1.114 |
| ImgH/(D12t32+D41t52) | 2.937 | 3.583 | 2.586 | 2.510 | 3.831 |
| V4+V5 | 47.058 | 47.058 | 47.058 | 47.058 | 47.058 |
| V5+V6 | 43.902 | 43.902 | 43.902 | 43.902 | 43.902 |
| V2+V3 | 74.933 | 74.933 | 74.933 | 74.933 | 74.933 |
| V4/V5 | 1.000 | 1.000 | 1.000 | 1.000 | 1.000 |
| V5/V6 | 1.155 | 1.155 | 1.155 | 1.155 | 1.155 |
| V3/V7 | 1.000 | 1.000 | 1.000 | 1.000 | 1.000 |
| ALT/G78 | 4.125 | 4.523 | 4.384 | 4.163 | 4.093 |
| (TTL+TL)/ImgH | 2.644 | 2.442 | 2.697 | 2.700 | 2.403 |
| (AAG+BFL)/D31t42 | 3.430 | 2.658 | 2.295 | 2.333 | 3.452 |
| EFL/(T1+T7+G78+T8) | 2.024 | 1.769 | 2.179 | 2.136 | 1.847 |
| D42t71/(T2+G23) | 4.738 | 3.022 | 3.025 | 4.781 | 3.630 |
| (G12+D42t71+BFL)/D31t42 | 2.999 | 2.021 | 1.877 | 1.913 | 2.630 |
| (G12+T2+G23+T3)/T4 | 3.900 | 2.804 | 2.156 | 2.448 | 2.405 |
| (T4+G45+T6+G67)/(G23+T3) | 1.848 | 2.005 | 2.199 | 1.456 | 1.800 |
| D12t51/(T5+G56) | 1.266 | 2.700 | 2.700 | 1.670 | 1.562 |
| (T6+G67+T8)/(T2+G34) | 1.191 | 1.460 | 1.086 | 0.933 | 1.440 |
| (G12+T2+T6+G67)/(T5+G56) | 0.776 | 1.700 | 1.578 | 0.660 | 0.789 |
| (G12+T2+T4+G45+T6+G67)/T7 | 1.431 | 1.317 | 2.100 | 1.476 | 1.104 |
| D41t61/(G23+G34) | 2.699 | 1.762 | 2.134 | 2.797 | 2.073 |
| (T3+D41t71)/T1 | 2.814 | 2.340 | 3.130 | 3.700 | 2.340 |
| (D41t71+BFL)/G78 | 3.300 | 2.811 | 3.293 | 3.265 | 3.078 |
| (T2+T3+AAG)/T7 | 3.461 | 2.634 | 3.700 | 3.696 | 2.855 |
| TTL/(T1+G12+T7+G78) | 2.597 | 2.443 | 2.796 | 2.800 | 2.541 |

FIG. 49

OPTICAL IMAGING LENS

CROSS-REFERENCE TO RELATED APPLICATION

This application claims the priority benefit of Chinese application serial no. 202011428409.5, filed on Dec. 9, 2020. The entirety of the above-mentioned patent application is hereby incorporated by reference herein and made a part of this specification.

BACKGROUND OF THE INVENTION

1. Field of the Invention

The invention relates to an optical element, and in particular to an optical imaging lens.

2. Description of Related Art

The specifications of portable electronic devices are changing quickly, and an optical imaging lens, which is one of the key components, has also developed more diversified. A main lens of a portable electronic device not only requires a larger aperture and maintains a shorter system length, but also requires higher pixel and higher resolution. High pixel implies that the image height of the lens must be increased, and a larger image sensor is used to receive imaging rays to increase the pixel demand.

However, due to the design of a large aperture, the lens receives more imaging rays, which generates various aberrations, reduces the imaging quality and increases the difficulty of design. Under the demand for high pixel, the resolution of the lens must be improved. Under the design demand for the large aperture, the design difficulty is multiplied. Therefore, how to add a plurality of lens elements into a limited system length of the lens and improve the resolution while increasing the aperture and image height is a problem that needs to be challenged and solved.

SUMMARY OF THE INVENTION

The invention provides an optical imaging lens which can enlarge an aperture, increase an image height and improve the resolution.

According to an embodiment of the invention, an optical imaging lens is provided, which includes a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. The fifth lens element has positive refracting power. An optical axis region of the image-side surface of the seventh lens element is convex. Lens elements of the optical imaging lens are only the eight lens elements described above, and satisfy the following conditional expressions: $V5 \leq 30.000$, $V6 \leq 30.000$, and $ImgH/(D12t32+D41t52) \geq 2.200$; where V5 and V6 respectively refer to Abbe numbers of the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

According to another embodiment of the invention, an optical imaging lens is provided, which includes a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The fifth lens element has positive refracting power. A periphery region of the image-side surface of the fifth lens element is convex. An optical axis region of the object-side surface of the sixth element is convex. The seventh lens element has positive refracting power. Lens elements of the optical imaging lens are only the eight lens elements described above, and satisfy the following conditional expressions: $V5+V6 \leq 50.000$, and $ImgH/(D12t32+D41t52) \geq 2.200$; where V5 and V6 respectively refer to Abbe numbers of the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

According to yet another embodiment of the invention, an optical imaging lens is provided, which includes a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. A periphery region of the image-side surface of the first lens element is concave. An optical axis region of the image-side surface of the fifth lens element is convex. The sixth lens element has negative refracting power. An optical axis region of the image-side surface of the seventh lens element is convex. Lens elements of the optical imaging lens are only the eight lens elements described above, and satisfy the following conditional expressions: $45.000 \leq V2+V3 \leq 85.000$, $V5+V6 \leq 50.000$, and $ImgH/(D12t32+D41t52) \geq 2.200$; where V2, V3, V5 and V6 respectively refer to Abbe numbers of the second lens element, the third lens element, the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

Based on the above, the optical imaging lens of the embodiments of the invention has the beneficial effects that: the optical imaging lens of the embodiments of the invention satisfies the surface shape of the above lens elements and the positive and negative design of the refracting power, and satisfies the above conditional expressions, so that the optical imaging lens of the embodiments of the invention can have good imaging quality, and can have a large aperture, increased image height and improved resolution.

To enable the above features and advantages of the invention to be more comprehensible, the invention is described in detail below through embodiments with reference to the accompanying drawings.

BRIEF DESCRIPTION OF THE DRAWINGS

FIG. 8 illustrates detailed optical data of an optical imaging lens of a first embodiment of the invention.

FIG. 9 illustrates aspheric parameters of an optical imaging lens of a first embodiment of the invention.

FIG. 12 illustrates detailed optical data of an optical imaging lens of a second embodiment of the invention.

FIG. 13 illustrates aspheric parameters of an optical imaging lens of a second embodiment of the invention.

FIG. 16 illustrates detailed optical data of an optical imaging lens of a third embodiment of the invention.

FIG. 17 illustrates aspheric parameters of an optical imaging lens of a third embodiment of the invention.

FIG. 20 illustrates detailed optical data of an optical imaging lens of a fourth embodiment of the invention.

FIG. 21 illustrates aspheric parameters of an optical imaging lens of a fourth embodiment of the invention.

FIG. 24 illustrates detailed optical data of an optical imaging lens of a fifth embodiment of the invention.

FIG. 25 illustrates aspheric parameters of an optical imaging lens of a fifth embodiment of the invention.

FIG. 26 is a schematic diagram of an optical imaging lens of a sixth embodiment of the invention.

FIG. 27A to FIG. 27D are diagrams of longitudinal spherical aberrations and various aberrations of an optical imaging lens of a sixth embodiment.

FIG. 28 illustrates detailed optical data of an optical imaging lens of a sixth embodiment of the invention.

FIG. 29 illustrates aspheric parameters of an optical imaging lens of a sixth embodiment of the invention.

FIG. 30 is a schematic diagram of an optical imaging lens of a seventh embodiment of the invention.

FIG. 31A to FIG. 31D are diagrams of longitudinal spherical aberrations and various aberrations of an optical imaging lens of a seventh embodiment.

FIG. 32 illustrates detailed optical data of an optical imaging lens of a seventh embodiment of the invention.

FIG. 33 illustrates aspheric parameters of an optical imaging lens of a seventh embodiment of the invention.

FIG. 34 is a schematic diagram of an optical imaging lens of an eighth embodiment of the invention.

FIG. 35A to FIG. 35D are diagrams of longitudinal spherical aberrations and various aberrations of an optical imaging lens of an eighth embodiment.

FIG. 36 illustrates detailed optical data of an optical imaging lens of an eighth embodiment of the invention.

FIG. 37 illustrates aspheric parameters of an optical imaging lens of an eighth embodiment of the invention.

FIG. 40 illustrates detailed optical data of an optical imaging lens of a ninth embodiment of the invention.

FIG. 41 illustrates aspheric parameters of an optical imaging lens of a ninth embodiment of the invention.

FIG. 44 illustrates detailed optical data of an optical imaging lens of a tenth embodiment of the invention.

FIG. 45 illustrates aspheric parameters of an optical imaging lens of a tenth embodiment of the invention.

FIG. 46 to FIG. 49 illustrate all important parameters and numerical values of relational expressions of the optical imaging lenses of first to tenth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
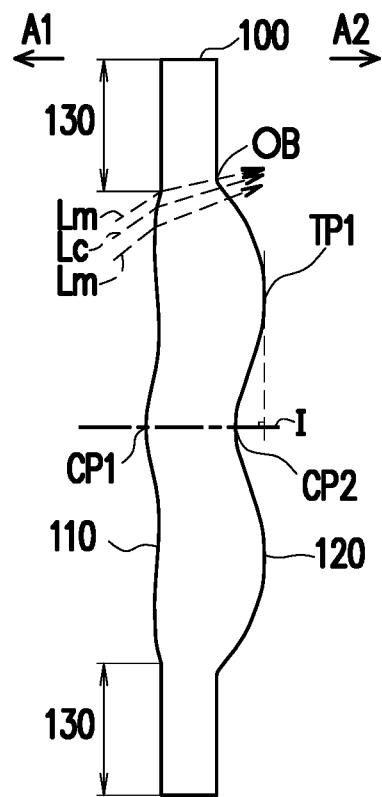
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
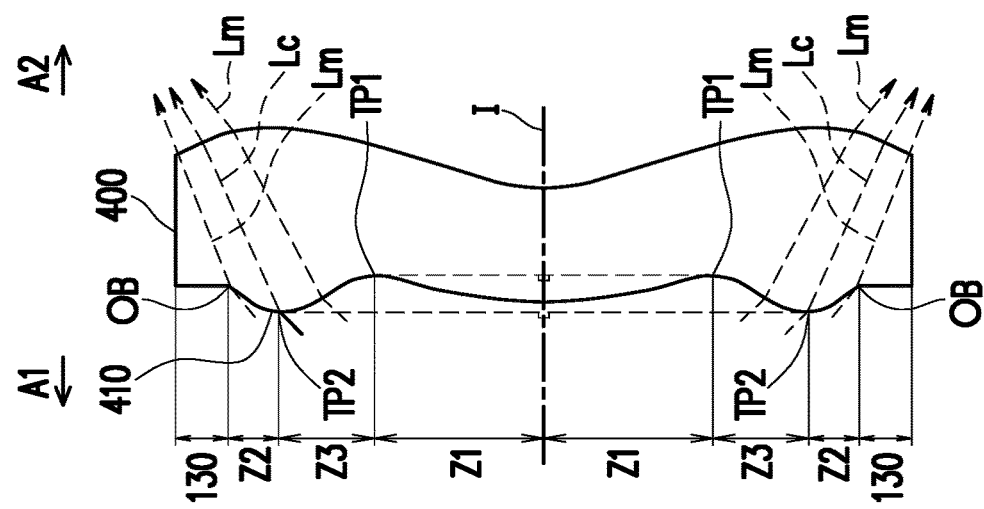
FIG. 4 is a schematic diagram illustrating a surface shape structure of a lens element of Example II.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
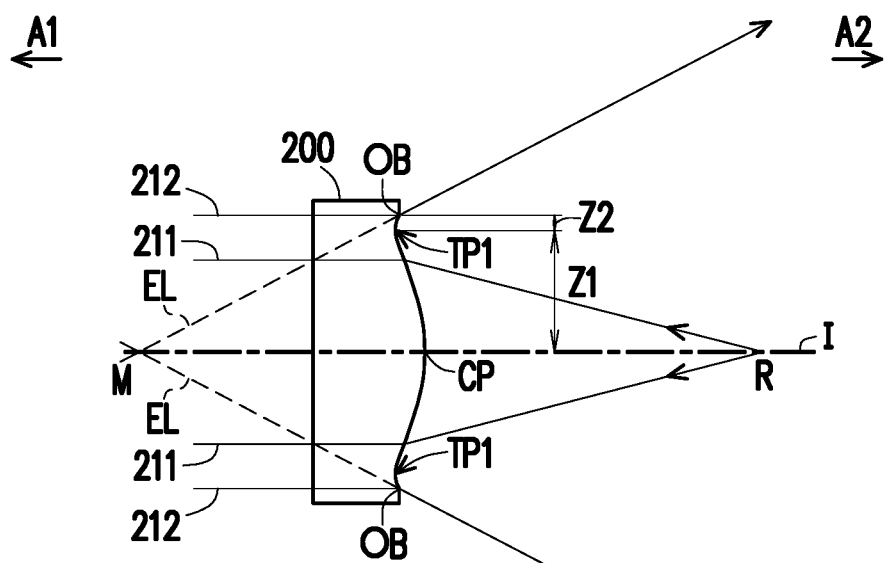
FIG. 2 is a schematic diagram illustrating a concave-convex structure and a focal point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
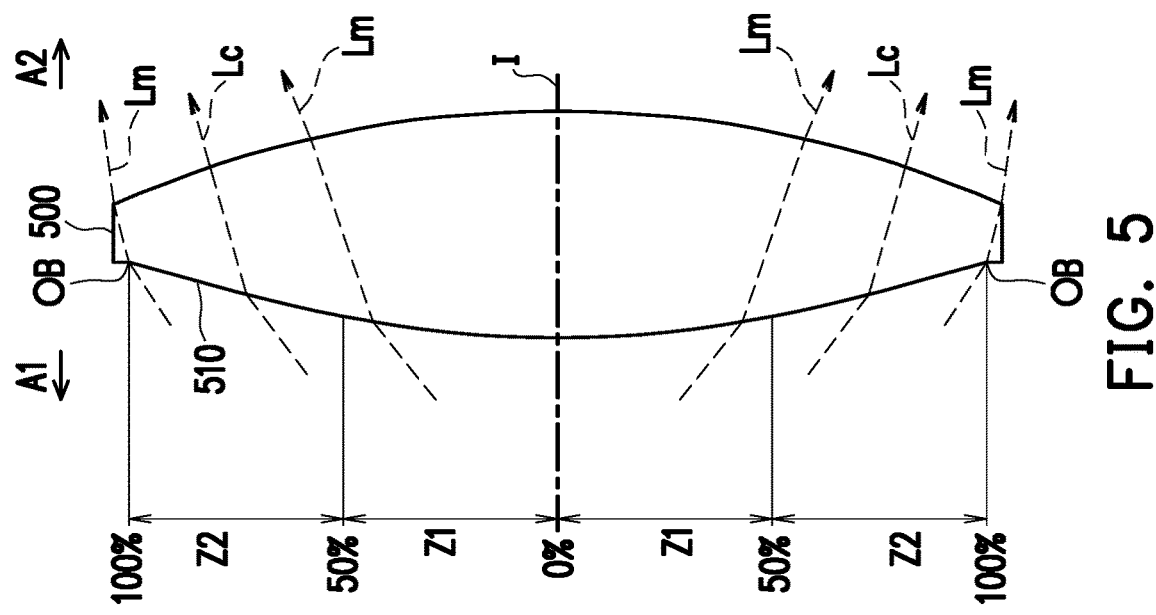
FIG. 3 is a schematic diagram illustrating a surface shape structure of a lens element of Example I.
Figure 5:
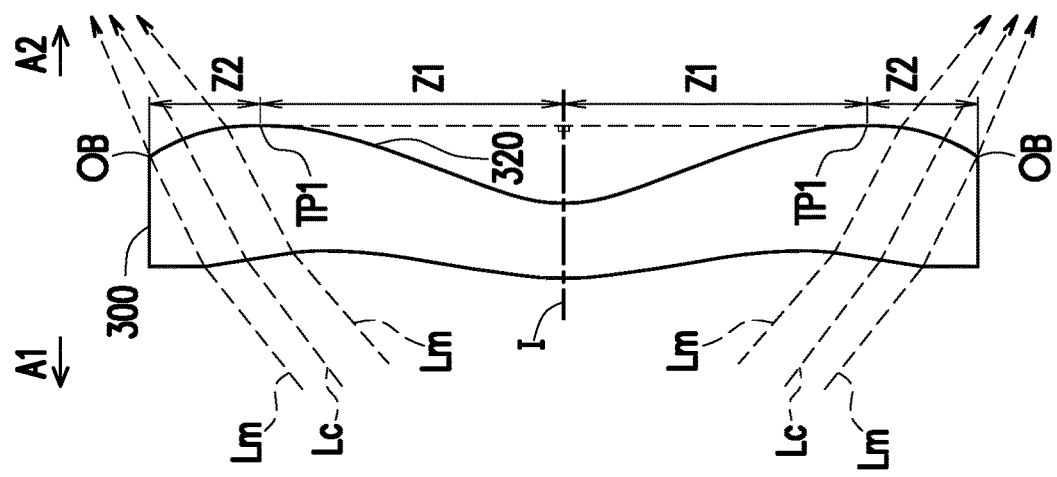
FIG. 5 is a schematic diagram illustrating a surface shape structure of a lens element of Example III.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
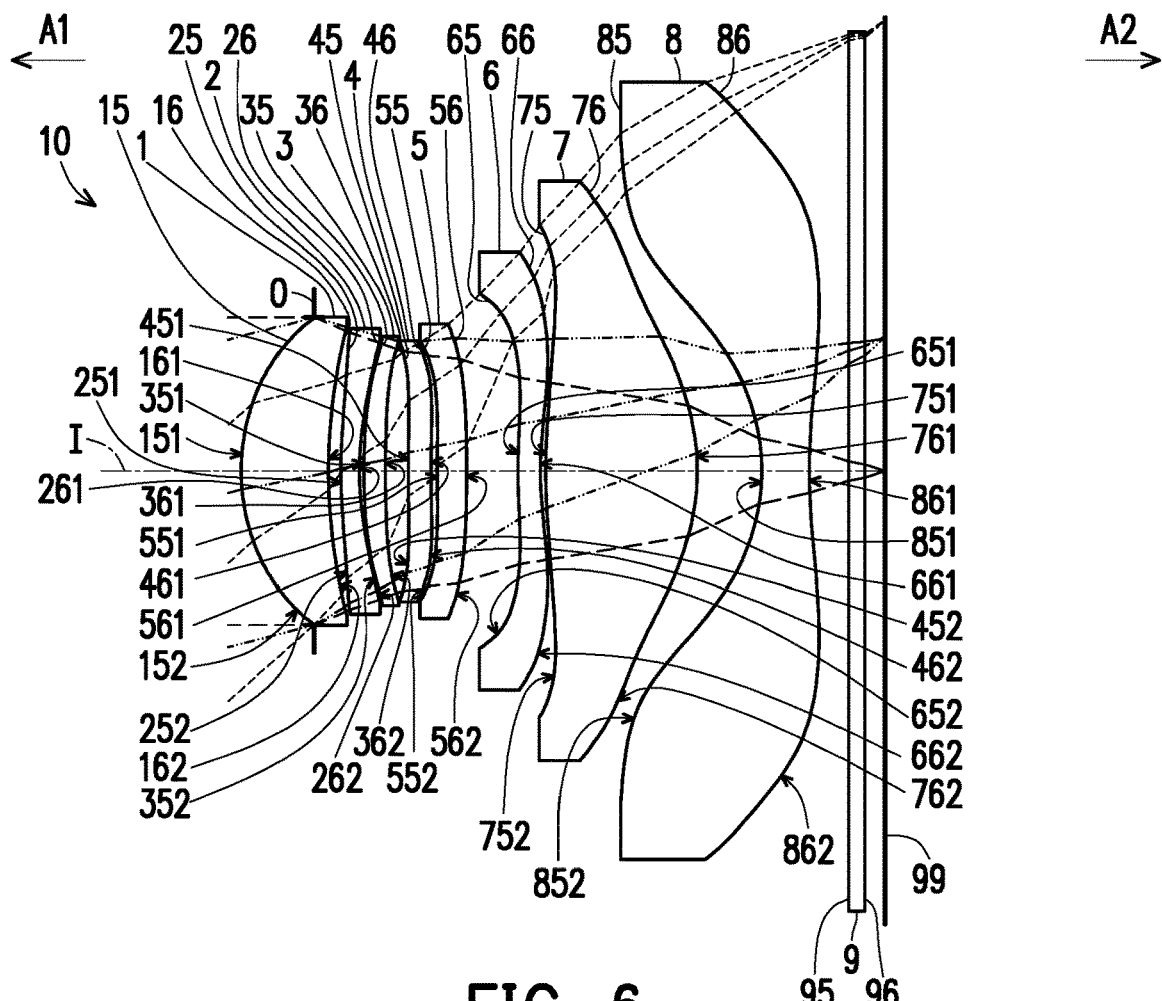
FIG. 6 is a schematic diagram of an optical imaging lens of a first embodiment of the invention.

FIG. 6 is a schematic diagram of an optical imaging lens of a first embodiment of the invention. FIG. 7A to FIG. 7D are diagrams of longitudinal spherical aberrations and various aberrations of the optical imaging lens of the first embodiment. Referring to FIG. 6 at first, an optical imaging lens 10 of the first embodiment of the invention includes an aperture 0, a first lens element 1, a second lens element 2, a third lens element 3, a fourth lens element 4, a fifth lens element 5, a sixth lens element 6, a seventh lens element 7, an eighth lens element 8 and a filter 9 sequentially arranged along an optical axis I of the optical imaging lens 10 from an object side A1 to an image side A2. When rays emitted by an object to be photographed enter the optical imaging lens 10, and may form an image on an image plane 99 after sequentially passing through the aperture 0, the first lens element 1, the second lens element 2, the third lens element 3, the fourth lens element 4, the fifth lens element 5, the sixth lens element 6, the seventh lens element 7, the eighth lens element 8 and the filter 9. The filter 9 is, for example, an infrared cut-off filter, which may allow rays (such as infrared rays or visible light) having an appropriate wavelength to pass through and filter out an infrared band that needs to be filtered. The filter 9 is arranged between the eighth lens element 8 and the image plane 99. It is supplemented that the object side A1 is a side facing the object to be photographed, and the image side A2 is a side facing the image plane 99.

In the present embodiment, the first lens element 1, the second lens element 2, the third lens element 3, the fourth lens element 4, the fifth lens element 5, the sixth lens element 6, the seventh lens element 7, the eighth lens element 8 and the filter 9 of the optical imaging lens 10 each has an object-side surface 15, 25, 35, 45, 55, 65, 75, 85, 95 facing the object side A1 and allowing imaging rays to pass through, and an image-side surface 16, 26, 36, 46, 56, 66, 76, 86, 96 facing the image side A2 and allowing the imaging rays to pass through. In the present embodiment, the aperture 0 is arranged on the object side A1 of the first lens element 1.

The first lens element 1 has positive refracting power. An optical axis region 151 of the object-side surface 15 of the first lens element 1 is convex, and a periphery region 152 thereof is convex. An optical axis region 161 of the image-side surface 16 of the first lens element 1 is concave, and a periphery region 162 thereof is concave. In the present embodiment, both the object-side surface 15 and the image-side surface 16 of the first lens element 1 are aspheric surfaces.

The second lens element 2 has negative refracting power. An optical axis region 251 of the object-side surface 25 of the second lens element 2 is convex, and a periphery region 252 thereof is convex. An optical axis region 261 of the image-side surface 26 of the second lens element 2 is concave, and a periphery region 262 thereof is concave. In the present embodiment, both the object-side surface 25 and the image-side surface 26 of the second lens element 2 are aspheric surfaces.

The third lens element 3 has positive refracting power. An optical axis region 351 of the object-side surface 35 of the third lens element 3 is convex, and a periphery region 352 thereof is convex. An optical axis region 361 of the image-side surface 36 of the third lens element 3 is concave, and a periphery region 362 thereof is concave. In the present embodiment, both the object-side surface 35 and the image-side surface 36 of the third lens element 3 are aspheric surfaces.

The fourth lens element 4 has negative refracting power. An optical axis region 451 of the object-side surface 45 of the fourth lens element 4 is convex, and a periphery region 452 thereof is concave. An optical axis region 461 of the image-side surface 46 of the fourth lens element 4 is concave, and a periphery region 462 thereof is convex. In the present embodiment, both the object-side surface 45 and the image-side surface 46 of the fourth lens element 4 are aspheric surfaces.

The fifth lens element 5 has positive refracting power. An optical axis region 551 of the object-side surface 55 of the fifth lens element 5 is convex, and a periphery region 552 thereof is concave. An optical axis region 561 of the image-side surface 56 of the fifth lens element 5 is convex, and a periphery region 562 thereof is convex. In the present embodiment, both the object-side surface 55 and the image-side surface 56 of the fifth lens element 5 are aspheric surfaces.

The sixth lens element 6 has negative refracting power. An optical axis region 651 of the object-side surface 65 of the sixth lens element 6 is convex, and a periphery region 652 thereof is concave. An optical axis region 661 of the image-side surface 66 of the sixth lens element 6 is concave, and a periphery region 662 thereof is convex. In the present embodiment, both the object-side surface 65 and the image-side surface 66 of the sixth lens element 6 are aspheric surfaces.

The seventh lens element 7 has positive refracting power. An optical axis region 751 of the object-side surface 75 of the seventh lens element 7 is convex, and a periphery region 752 thereof is concave. An optical axis region 761 of the image-side surface 76 of the seventh lens element 7 is convex, and a periphery region 762 thereof is convex. In the present embodiment, both the object-side surface 75 and the image-side surface 76 of the seventh lens element 7 are aspheric surfaces.

The eighth lens element 8 has negative refracting power. An optical axis region 851 of the object-side surface 85 of the eighth lens element 8 is concave, and a periphery region 852 thereof is concave. An optical axis region 861 of the image-side surface 86 of the eighth lens element 8 is concave, and a periphery region 862 thereof is convex. In the present embodiment, both the object-side surface 85 and the image-side surface 86 of the eighth lens element 8 are aspheric surfaces.

Other detailed optical data of the first embodiment is as shown in FIG. 8, and the optical imaging lens 10 of the first embodiment has an entire effective focal length (EFL) of 6.564 millimeters (mm), a half field of view (HFOV) of 41.993°, a system length of 8.316 mm, an F-number (Fno) of 1.650, and an image height of 5.800 mm. The system length is a distance from the object-side surface 15 of the first lens element 1 to the image plane 99 on the optical axis I.

In addition, in the present embodiment, a total of sixteen surfaces, including the object-side surfaces 15, 25, 35, 45, 55, 65, 75, 85 and the image-side surfaces 16, 26, 36, 46, 56, 66, 76, 86 of the first lens element 1, the second lens element 2, the third lens element 3, the fourth lens element 4, the fifth lens element 5, the sixth lens element 6, the seventh lens element 7 and the eighth lens element 8, are all aspheric surfaces, and these aspheric surfaces are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

Y: a distance between a point on an aspheric curve and the optical axis;
Z: an aspheric depth, i.e., a perpendicular distance between a point, which is Y away from the optical axis, on the aspheric surface and a tangent plane tangent to a vertex of the aspheric surface on the optical axis;
R: a radius of curvature of a surface of the lens element;
K: a conic constant;
$a_i$: an ith-order aspheric coefficient.

Various aspheric coefficients of the object-side surface 15 of the first lens element 1 to the image-side surface 86 of the eighth lens element 8 in Formula (1) are as shown in FIG. 9. Column number 15 in FIG. 9 denotes an aspheric coefficient of the object-side surface 15 of the first lens element 1, and the rest columns may be deduced by analogy. In the first embodiment, the second-order aspheric coefficients $a_2$ of the object-side surface 15 of the first lens element 1 to the image-side surface 86 of the eighth lens element 8 are all zero. In addition, relations among all important parameters in the optical imaging lens 10 of the first embodiment are as shown in FIG. 46 to FIG. 49.

EFL is an effective focal length (EFL) of the optical imaging lens 10;
Fno is an F-number of the optical imaging lens 10;
HFOV is a half field of view of the optical imaging lens 10;
ImgH is an image height of the optical imaging lens 10;
T1 is a thickness of the first lens element 1 on the optical axis I, in mm;
T2 is a thickness of the second lens element 2 on the optical axis I, in mm;
T3 is a thickness of the third lens element 3 on the optical axis I, in mm;
T4 is a thickness of the fourth lens element 4 on the optical axis I, in mm;
T5 is a thickness of the fifth lens element 5 on the optical axis I, in mm;
T6 is a thickness of the sixth lens element 6 on the optical axis I, in mm;
T7 is a thickness of the seventh lens element 7 on the optical axis I, in mm;
T8 is a thickness of the eighth lens element 8 on the optical axis I, in mm;
G12 is a distance from the image-side surface 16 of the first lens element 1 to the object-side surface 25 of the second lens element 2 on the optical axis I, i.e., an air gap between the first lens element 1 and the second lens element 2 on the optical axis I, in mm;
G23 is a distance from the image-side surface 26 of the second lens element 2 to the object-side surface 35 of the third lens element 3 on the optical axis I, i.e., an air gap between the second lens element 2 and the third lens element 3 on the optical axis I, in mm;
G34 is a distance from the image-side surface 36 of the third lens element 3 to the object-side surface 45 of the fourth lens element 4 on the optical axis I, i.e., an air gap between the third lens element 3 and the fourth lens element 4 on the optical axis I, in mm;
G45 is a distance from the image-side surface 46 of the fourth lens element 4 to the object-side surface 55 of the fifth lens element 5 on the optical axis I, i.e., an air gap between the fourth lens element 4 and the fifth lens element 5 on the optical axis I, in mm;
G56 is a distance from the image-side surface 56 of the fifth lens element 5 to the object-side surface 65 of the sixth lens element 6 on the optical axis I, i.e., an air gap between the fifth lens element 5 and the sixth lens element 6 on the optical axis I, in mm;
G67 is a distance from the image-side surface 66 of the sixth lens element 6 to the object-side surface 75 of the fifth lens element 7 on the optical axis I, i.e., an air gap between the sixth lens element 6 and the seventh lens element 7 on the optical axis I, in mm;
G78 is a distance from the image-side surface 76 of the seventh lens element 7 to the object-side surface 85 of the eighth lens element 8 on the optical axis I, i.e., an air gap between the seventh lens element 7 and the eighth lens element 8 on the optical axis I, in mm;

G8F is an air gap between the eighth lens element 8 and the filter 9 on the optical axis I, in mm;

TF is a thickness of the filter 9 on the optical axis I, in mm;

GFP is an air gap between the filter 9 and the image plane 99 on the optical axis I, in mm;

V1 is an Abbe number of the first lens element 1;

V2 is an Abbe number of the second lens element 2;

V3 is an Abbe number of the third lens element 3;

V4 is an Abbe number of the fourth lens element 4;

V5 is an Abbe number of the fifth lens element 5;

V6 is an Abbe number of the sixth lens element 6;

V7 is an Abbe number of the seventh lens element 7;

V8 is an Abbe number of the eighth lens element 8;

ALT is a sum of the thicknesses of the eight lens elements from the first lens element 1 to the eighth lens element 8 on the optical axis I, i.e., a sum of T1, T2, T3, T4, T5, T6, T7 and T8, in mm;

AAG is a sum of seven air gaps from the first lens element 1 to the eighth lens element 8 on the optical axis I, i.e., a sum of G12, G23, G34, G45, G56, G67 and G78, in mm;

TTL is a distance from the object-side surface 15 of the first lens element 1 to the image plane 99 on the optical axis I, in mm;

TL is a distance from the object-side surface 15 of the first lens element 1 to the image-side surface 86 of the eighth lens element 8 on the optical axis I, in mm;

BFL is a distance from the image-side surface 86 of the eighth lens element 8 to the image plane 99 on the optical axis I, in mm;

D12t32 is a distance from the image-side surface 16 of the first lens element 1 to the image-side surface 36 of the third lens element 3 on the optical axis I, in mm;

D41t52 is a distance from the object-side surface 45 of the fourth lens element 4 to the image-side surface 56 of the fifth lens element 5 on the optical axis I, in mm;

D31t42 is a distance from the object-side surface 35 of the third lens element 3 to the image-side surface 46 of the fourth lens element 4 on the optical axis I, in mm;

D42t71 is a distance from the image-side surface 46 of the fourth lens element 4 to the object-side surface 75 of the seventh lens element 7 on the optical axis I, in mm;

D12t51 is a distance from the image-side surface 16 of the first lens element 1 to the object-side surface 55 of the fifth lens element 5 on the optical axis I, in mm;

D41t61 is a distance from the object-side surface 45 of the fourth lens element 4 to the object-side surface 65 of the sixth lens element 6 on the optical axis I, in mm; and D41t71 is a distance from the object-side surface 45 of the fourth lens element 4 to the object-side surface 75 of the seventh lens element 7 on the optical axis I, in mm.

Figures 7A, 7B, 7C, 7D:
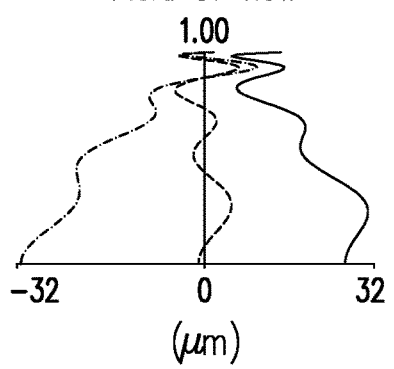
FIG. 7A to FIG. 7D are diagrams of longitudinal spherical aberrations and various aberrations of an optical imaging lens of a first embodiment.

Referring to FIG. 7A to FIG. 7D cooperatively, FIG. 7A illustrates a longitudinal spherical aberration of the first embodiment; the diagrams of FIG. 7B and FIG. 7C respectively illustrate a field curvature aberration in a sagittal direction and a field curvature aberration in a tangential direction on the image plane 99 of the first embodiment at wavelengths of 470 nanometers (nm), 555 nm and 650 nm; and the diagram of FIG. 7D illustrates a distortion aberration on the image plane 99 of the first embodiment at wavelengths of 470 nm, 555 nm and 650 nm. In FIG. 7A which shows the longitudinal spherical aberration of the present first embodiment, it can be seen from the deflection amplitude of a curve of each representative wavelength that deflections of imaging points of off-axis rays at different heights are controlled within a range of ±32 microns (μm), so the present first embodiment obviously improves the spherical aberration of the same wavelength in deed. In addition, distances among the three representative wavelengths are also quite close, it indicates that imaging positions of different wavelength rays are quite concentrated, so that the chromatic aberration is also obviously improved.

In the two field curvature aberration diagrams of FIG. 7B and FIG. 7C, the field curvature aberrations of three representative wavelengths within an entire field of view range fall within ±400 μm, it indicates that an optical system of the present first embodiment can effectively eliminate the aberration. The distortion aberration diagram of FIG. 7D shows that the distortion aberration of the present first embodiment is maintained within a range of ±3%, it indicates that the distortion aberration of the present first embodiment has met an imaging quality requirement of the optical system. It is indicated accordingly that compared with an existing optical lens, the present first embodiment can still provide good imaging quality in the circumstances that the Fno is 1.650 and the image height is 5.800 mm.

Figure 10:
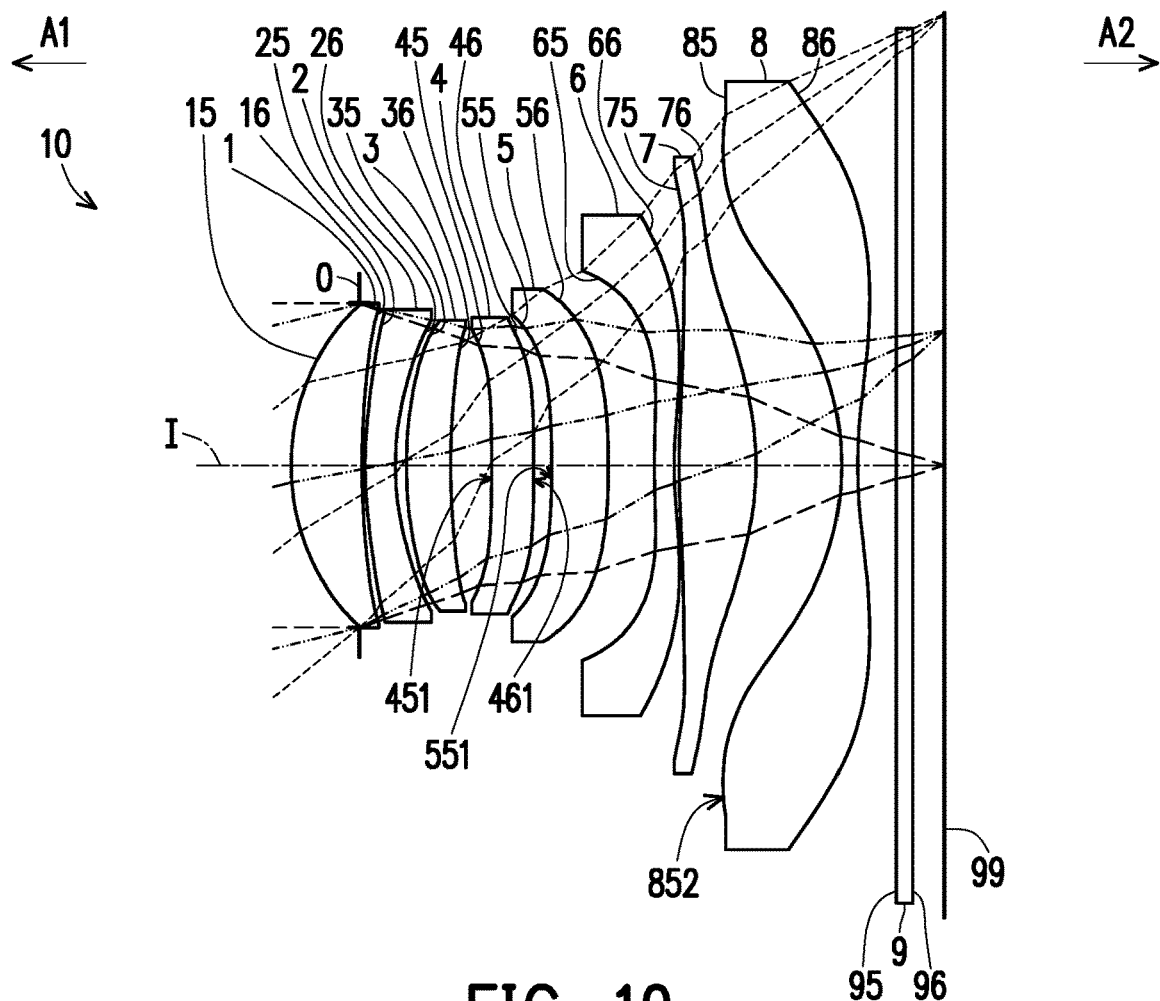
FIG. 10 is a schematic diagram of an optical imaging lens of a second embodiment of the invention.

FIG. 10 is a schematic diagram of an optical imaging lens of a second embodiment of the invention. FIG. 11A to FIG. 11D are diagrams of longitudinal spherical aberrations and various aberrations of the optical imaging lens of the second embodiment. Referring to FIG. 10 at first, the second embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the second embodiment, the fourth lens element 4 has positive refracting power. The optical axis region 451 of the object-side surface 45 of the fourth lens element is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 10.

Detailed optical data of the optical imaging lens 10 of the second embodiment are as shown in FIG. 12, and the optical imaging lens 10 of the second embodiment has an entire EFL of 6.863 mm, an HFOV of 39.228°, an Fno of 1.650, a system length of 8.386 mm, and an image height of 5.800 mm.

As shown in FIG. 13, various aspheric coefficients of the object-side surface 15 of the first lens element 1 to the image-side surface 86 of the eighth lens 8 of the second embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the second embodiment are as shown in FIG. 46 to FIG. 49.

Figures 11A, 11B, 11C, 11D:
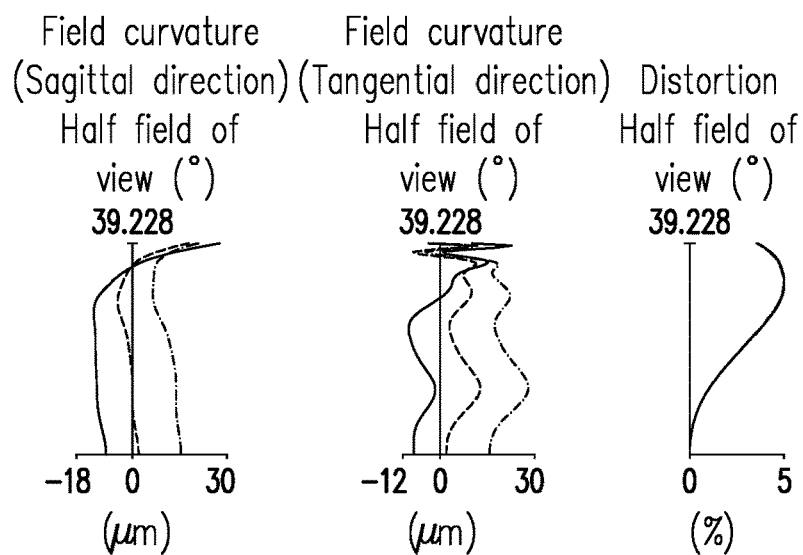
FIG. 11A to FIG. 11D are diagrams of longitudinal spherical aberrations and various aberrations of an optical imaging lens of a second embodiment.

FIG. 11A illustrates a longitudinal spherical aberration of the present second embodiment, and deflections of imaging points of off-axis rays at different heights are controlled within a range of ±18 μm. In the two field curvature aberration diagrams of FIG. 11B and FIG. 11C, the field curvature aberrations of three representative wavelengths within an entire field of view range fall within ±30 μm. The distortion aberration diagram of FIG. 11D shows that the distortion aberration of the present second embodiment is maintained within a range of ±5%. According to this, the longitudinal spherical aberration, the field curvature aberration in the sagittal direction and the field curvature aberration in the tangential direction of the present second embodiment are better than those of the first embodiment, and good imaging quality is provided.

Figure 14:
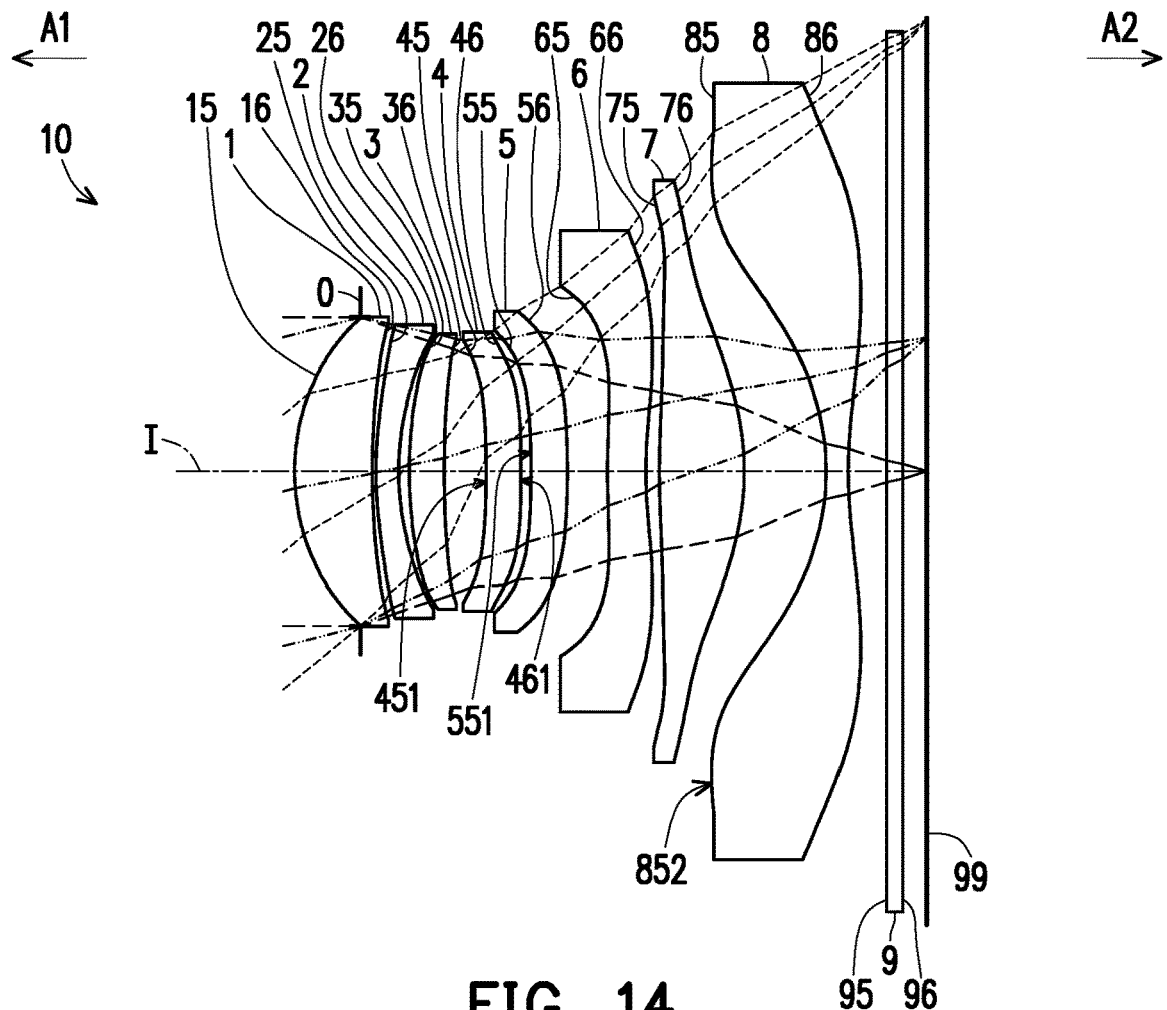
FIG. 14 is a schematic diagram of an optical imaging lens of a third embodiment of the invention.

FIG. 14 is a schematic diagram of an optical imaging lens of a third embodiment of the invention. FIG. 15A to FIG. 15D are diagrams of longitudinal spherical aberrations and various aberrations of the optical imaging lens of the third embodiment. Referring to FIG. 14 at first, the third embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the third embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are partially omitted in FIG. 14.

Detailed optical data of the optical imaging lens 10 of the third embodiment are as shown in FIG. 16, and the optical imaging lens 10 of the third embodiment has an entire EFL of 6.605 mm, an HFOV of 39.493°, an Fno of 1.650, a system length of 8.182 mm, and an image height of 5.800 mm.

As shown in FIG. 17, various aspheric coefficients of the object-side surface 15 of the first lens element 1 to the image-side surface 86 of the eighth lens 8 of the third embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the third embodiment are as shown in FIG. 46 to FIG. 49.

Figures 15A, 15B, 15C, 15D:
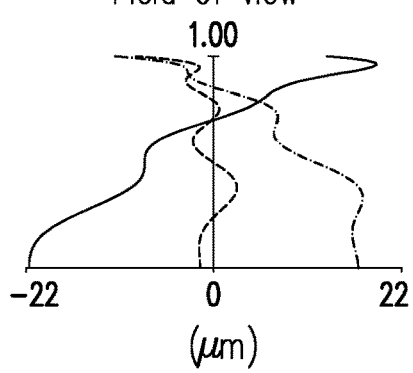
FIG. 15A to FIG. 15D are diagrams of longitudinal spherical aberrations and various aberrations of an optical imaging lens of a third embodiment.

FIG. 15A illustrates a longitudinal spherical aberration of the present third embodiment, and deflections of imaging points of off-axis rays at different heights are controlled within a range of ±22 µm. In the two field curvature aberration diagrams of FIG. 15B and FIG. 15C, the field curvature aberrations of three representative wavelengths within an entire field of view range fall within ±80 µm. The distortion aberration diagram of FIG. 15D shows that the distortion aberration of the present third embodiment is maintained within a range of ±7%. According to this, the longitudinal spherical aberration, the field curvature aberration in the sagittal direction and the field curvature aberration in the tangential direction of the present third embodiment are better than those of the first embodiment, and good imaging quality is provided. In addition, the system length of the third embodiment is less than that of the first embodiment.

Figure 18:
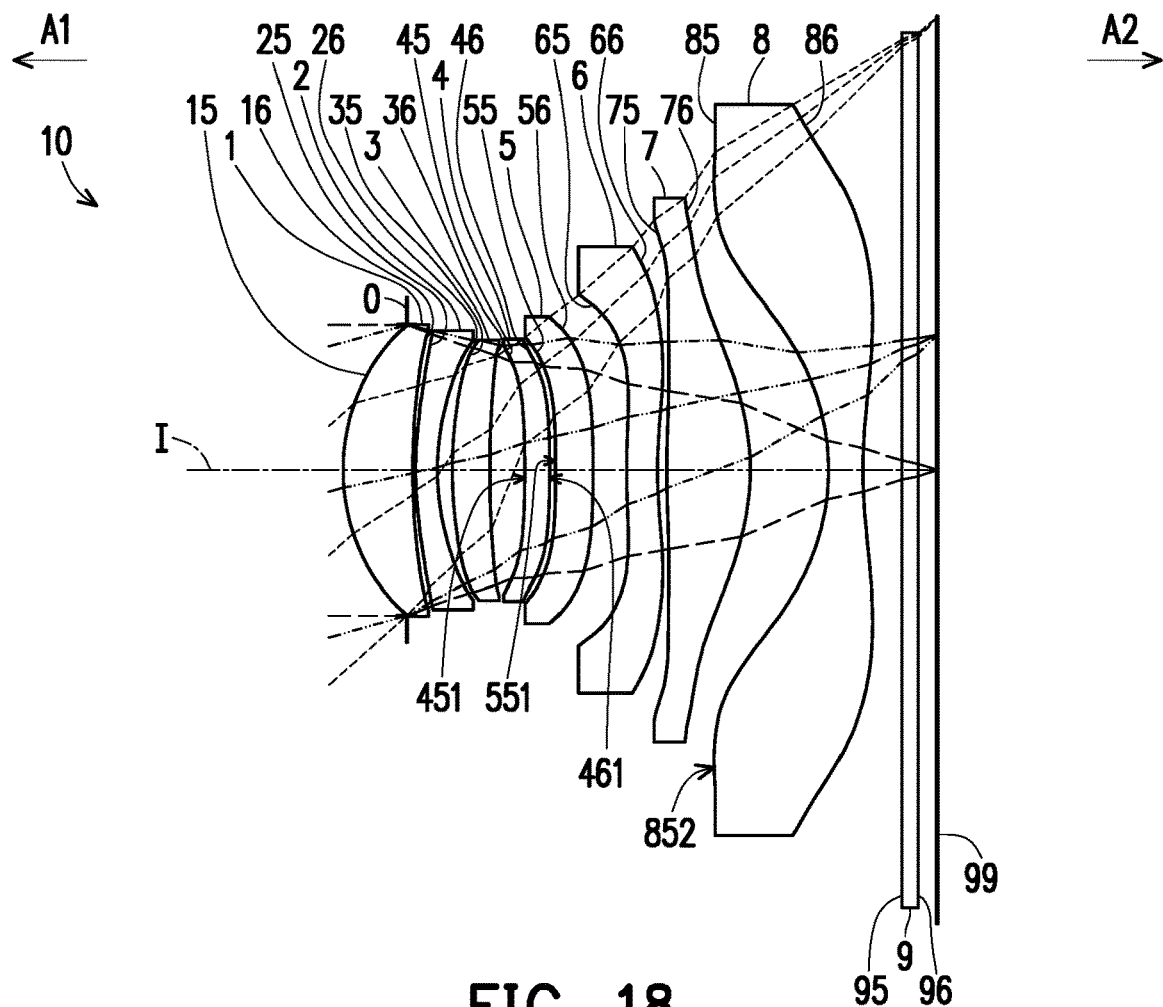
FIG. 18 is a schematic diagram of an optical imaging lens of a fourth embodiment of the invention.

FIG. 18 is a schematic diagram of an optical imaging lens of a fourth embodiment of the invention. FIG. 19A to FIG. 19D are diagrams of longitudinal spherical aberrations and various aberrations of the optical imaging lens of the fourth embodiment. Referring to FIG. 18 at first, the fourth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the fourth embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are partially omitted in FIG. 18.

Detailed optical data of the optical imaging lens 10 of the fourth embodiment are as shown in FIG. 20, and the optical imaging lens 10 of the fourth embodiment has an entire EFL of 6.158 mm, an HFOV of 41.779°, an Fno of 1.650, a system length of 7.616 mm, and an image height of 5.800 mm.

As shown in FIG. 21, various aspheric coefficients of the object-side surface 15 of the first lens element 1 to the image-side surface 86 of the eighth lens 8 of the fourth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the fourth embodiment are as shown in FIG. 46 to FIG. 49.

Figures 19A, 19B, 19C, 19D:
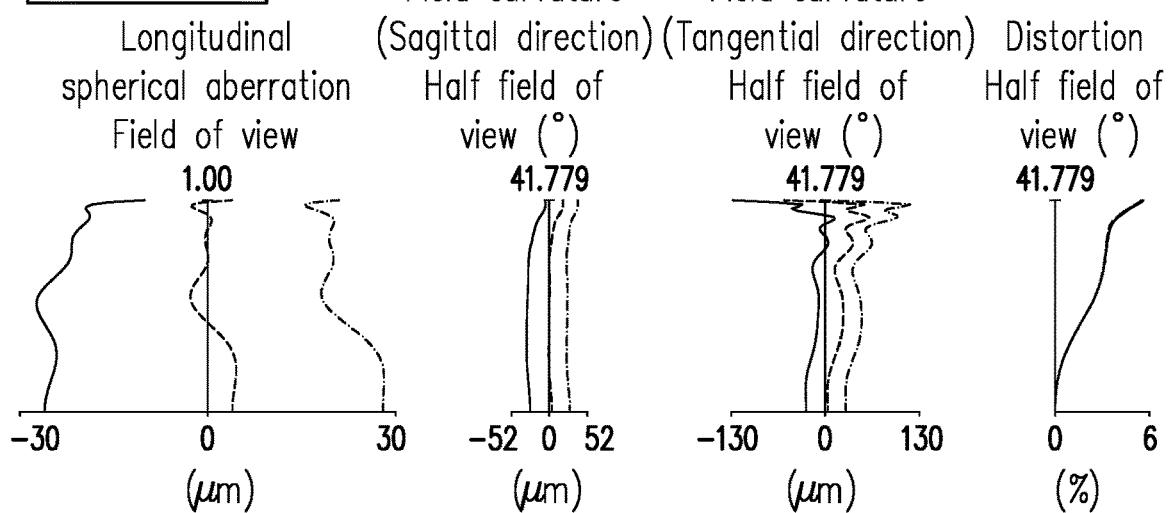
FIG. 19A to FIG. 19D are diagrams of longitudinal spherical aberrations and various aberrations of an optical imaging lens of a fourth embodiment.

FIG. 19A illustrates a longitudinal spherical aberration of the present fourth embodiment, and deflections of imaging points of off-axis rays at different heights are controlled within a range of ±30 µm. In the two field curvature aberration diagrams of FIG. 19B and FIG. 19C, the field curvature aberrations of three representative wavelengths within an entire field of view range fall within ±130 µm. The distortion aberration diagram of FIG. 19D shows that the distortion aberration of the present fourth embodiment is maintained within a range of ±6%. According to this, the field curvature aberration in the sagittal direction and the field curvature aberration in the tangential direction of the present fourth embodiment are better than those of the first embodiment, and good imaging quality is provided. In addition, the system length of the fourth embodiment is less than that of the first embodiment.

Figure 22:
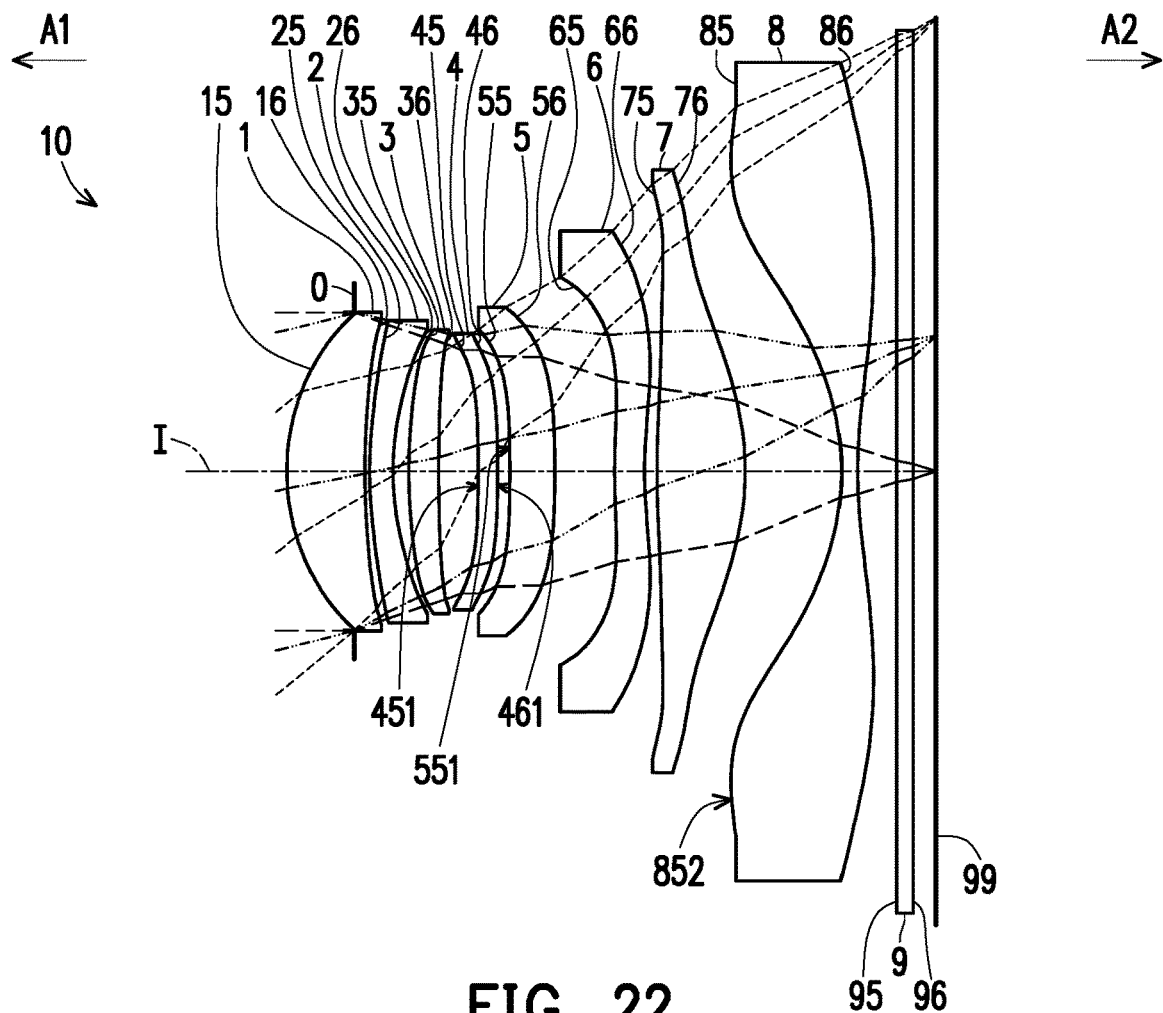
FIG. 22 is a schematic diagram of an optical imaging lens of a fifth embodiment of the invention.

FIG. 22 is a schematic diagram of an optical imaging lens of a fifth embodiment of the invention. FIG. 23A to FIG. 23D are diagrams of longitudinal spherical aberrations and various aberrations of the optical imaging lens of the fifth embodiment. Referring to FIG. 22 at first, the fifth embodiment of the optical imaging lens 10 of the invention is approximately similar to the first embodiment, except that: various optical data, aspheric coefficients, and other parameters among these lens elements 1, 2, 3, 4, 5, 6, 7 and 8 are different more or less. In addition, in the fifth embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are partially omitted in FIG. 22.

Detailed optical data of the optical imaging lens 10 of the fifth embodiment are as shown in FIG. 24, and the optical imaging lens 10 of the fifth embodiment has an entire EFL of 6.721 mm, an HFOV of 39.605°, an Fno of 1.650, a system length of 8.318 mm, and an image height of 5.800 mm.

As shown in FIG. 25, various aspheric coefficients of the object-side surface 15 of the first lens element 1 to the image-side surface 86 of the eighth lens 8 of the fifth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the fifth embodiment are as shown in FIG. 46 to FIG. 49.

Figure 23A:
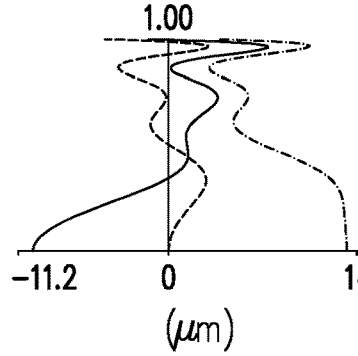
FIG. 23A to FIG. 23D are diagrams of longitudinal spherical aberrations and various aberrations of an optical imaging lens of a fifth embodiment.
Figure 23B:
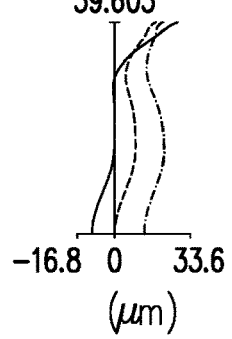
Figure 23C:
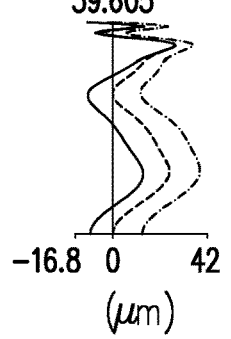
Figure 23D:
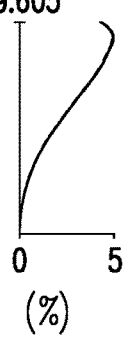

FIG. 23A illustrates a longitudinal spherical aberration of the present fifth embodiment, and deflections of imaging points of off-axis rays at different heights are controlled within a range of ±14 µm. In the two field curvature aberration diagrams of FIG. 23B and FIG. 23C, the field curvature aberrations of three representative wavelengths within an entire field of view range fall within ±42 µm. The distortion aberration diagram of FIG. 23D shows that the distortion aberration of the present fifth embodiment is maintained within a range of ±5%. According to this, the longitudinal spherical aberration, the field curvature aberration in the sagittal direction and the field curvature aberration in the tangential direction of the present fifth embodiment are better than those of the first embodiment, and good imaging quality is provided.

FIG. 26 is a schematic diagram of an optical imaging lens of a sixth embodiment of the invention. FIG. 27A to FIG. 27D are diagrams of longitudinal spherical aberrations and various aberrations of the optical imaging lens of the sixth embodiment. Referring to FIG. 26 at first, the sixth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the sixth embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 26.

Detailed optical data of the optical imaging lens 10 of the sixth embodiment are as shown in FIG. 28, and the optical imaging lens 10 of the sixth embodiment has an entire EFL of 6.628 mm, an HFOV of 39.463°, an Fno of 1.650, a system length of 8.19 mm, and an image height of 5.800 mm.

As shown in FIG. 29, various aspheric coefficients of the object-side surface 15 of the first lens element 1 to the image-side surface 86 of the eighth lens 8 of the sixth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the sixth embodiment are as shown in FIG. 46 to FIG. 49.

FIG. 27A illustrates a longitudinal spherical aberration of the present sixth embodiment, and deflections of imaging points of off-axis rays at different heights are controlled within a range of ±14 µm. In the two field curvature aberration diagrams of FIG. 27B and FIG. 27C, focal length variations of three representative wavelengths within an entire field of view range fall within ±50 µm. The distortion aberration diagram of FIG. 27D shows that the distortion aberration of the present sixth embodiment is maintained within a range of ±7%. According to this, the longitudinal spherical aberration, the field curvature aberration in the sagittal direction and the field curvature aberration in the tangential direction of the present sixth embodiment are better than those of the first embodiment, and good imaging quality is provided. In addition, the system length of the sixth embodiment is less than that of the first embodiment.

FIG. 30 is a schematic diagram of an optical imaging lens of a seventh embodiment of the invention. FIG. 31A to FIG. 31D are diagrams of longitudinal spherical aberrations and various aberrations of the optical imaging lens of the seventh embodiment. Referring to FIG. 30 at first, the seventh embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the seventh embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 30.

Detailed optical data of the optical imaging lens 10 of the seventh embodiment are as shown in FIG. 32, and the optical imaging lens 10 of the seventh embodiment has an entire EFL of 6.101 mm, an HFOV of 41.776°, an Fno of 1.650, a system length of 7.548 mm, and an image height of 5.800 mm.

As shown in FIG. 33, various aspheric coefficients of the object-side surface 15 of the first lens element 1 to the image-side surface 86 of the eighth lens 8 of the seventh embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the seventh embodiment are as shown in FIG. 46 to FIG. 49.

FIG. 31A illustrates a longitudinal spherical aberration of the present seventh embodiment, and deflections of imaging points of off-axis rays at different heights are controlled within a range of ±20 µm. In the two field curvature aberration diagrams of FIG. 31B and FIG. 31C, focal length variables of three representative wavelengths within an entire field of view range fall within ±200 µm. The distortion aberration diagram of FIG. 31D shows that the distortion aberration of the present seventh embodiment is maintained within a range of ±7%. According to this, the longitudinal spherical aberration, the field curvature aberration in the sagittal direction and the field curvature aberration in the tangential direction of the present seventh embodiment are better than those of the first embodiment, and good imaging quality is provided. In addition, the system length of the seventh embodiment is less than that of the first embodiment.

FIG. 34 is a schematic diagram of an optical imaging lens of an eighth embodiment of the invention. FIG. 35A to FIG. 35D are diagrams of longitudinal spherical aberrations and various aberrations of the optical imaging lens of the eighth embodiment. Referring to FIG. 34 at first, the eighth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the eighth embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 34.

Detailed optical data of the optical imaging lens 10 of the eighth embodiment are as shown in FIG. 36, and the optical imaging lens 10 of the eighth embodiment has an entire EFL of 6.863 mm, an HFOV of 39.429°, an Fno of 1.650, a system length of 8.403 mm, and an image height of 5.800 mm.

As shown in FIG. 37, various aspheric coefficients of the object-side surface 15 of the first lens element 1 to the image-side surface 86 of the eighth lens 8 of the eighth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the eighth embodiment are as shown in FIG. 46 to FIG. 49.

FIG. 35A illustrates a longitudinal spherical aberration of the present eighth embodiment, and deflections of imaging points of off-axis rays at different heights are controlled within a range of ±22 μm. In the two field curvature aberration diagrams of FIG. 35B and FIG. 35C, focal length variables of three representative wavelengths within an entire field of view range fall within ±60 μm. The distortion aberration diagram of FIG. 35D shows that the distortion aberration of the present eighth embodiment is maintained within a range of ±3.5%. According to this, the longitudinal spherical aberration, the field curvature aberration in the sagittal direction and the field curvature aberration in the tangential direction of the present eighth embodiment are better than those of the first embodiment, and good imaging quality is provided.

Figure 38:
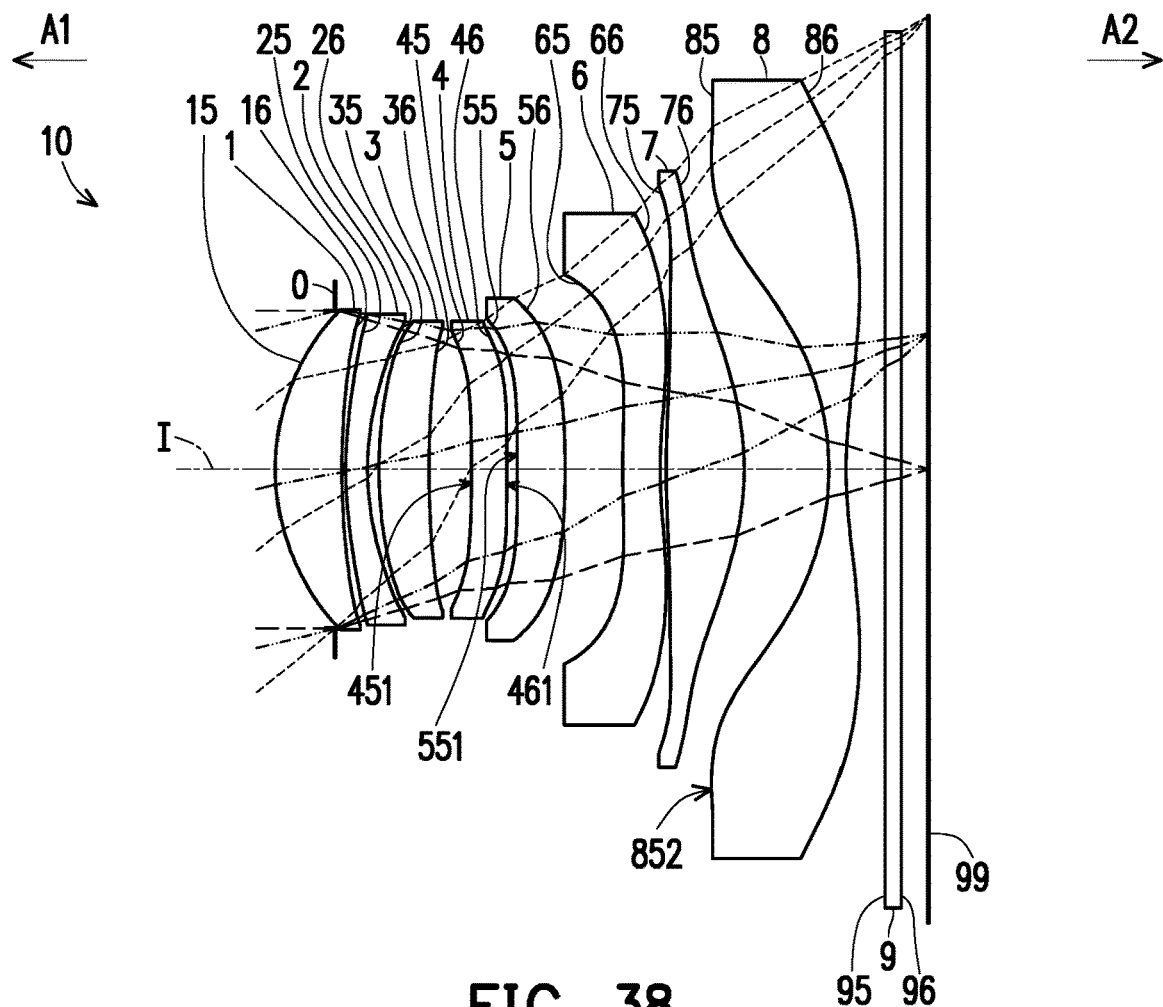
FIG. 38 is a schematic diagram of an optical imaging lens of a ninth embodiment of the invention.

FIG. 38 is a schematic diagram of an optical imaging lens of a ninth embodiment of the invention. FIG. 39A to FIG. 39D are diagrams of longitudinal spherical aberrations and various aberrations of the optical imaging lens of the ninth embodiment. Referring to FIG. 38 at first, the ninth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the ninth embodiment, the optical axis region 451 of the object-side surface 45 of the fourth lens element 4 is concave, and the optical axis region 461 of the image-side surface 46 of the fourth lens element is convex. The optical axis region 551 of the object-side surface 55 of the fifth lens element 5 is concave. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 38.

Detailed optical data of the optical imaging lens 10 of the ninth embodiment are as shown in FIG. 40, and the optical imaging lens 10 of the ninth embodiment has an entire EFL of 6.719 mm, an HFOV of 39.545°, an Fno of 1.650, a system length of 8.358 mm, and an image height of 5.800 mm.

As shown in FIG. 41, various aspheric coefficients of the object-side surface 15 of the first lens element 1 to the image-side surface 86 of the eighth lens 8 of the ninth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the ninth embodiment are as shown in FIG. 46 to FIG. 49.

Figures 39A, 39B, 39C, 39D:
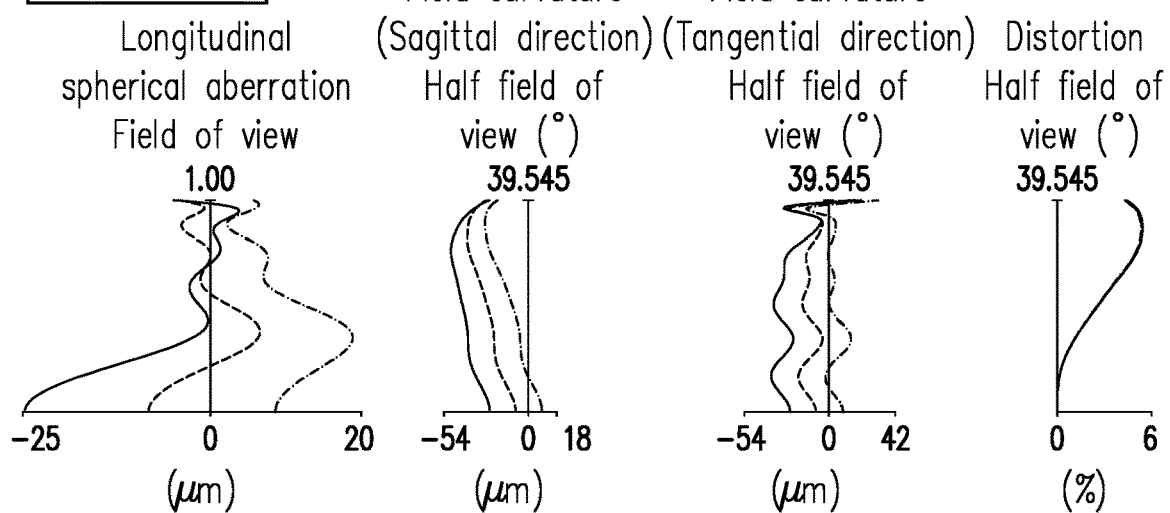
FIG. 39A to FIG. 39D are diagrams of longitudinal spherical aberrations and various aberrations of an optical imaging lens of a ninth embodiment.

FIG. 39A illustrates a longitudinal spherical aberration of the present ninth embodiment, and deflections of imaging points of off-axis rays at different heights are controlled within a range of ±25 μm. In the two field curvature aberration diagrams of FIG. 39B and FIG. 39C, focal length variables of three representative wavelengths within an entire field of view range fall within ±50 μm. The distortion aberration diagram of FIG. 39D shows that the distortion aberration of the present ninth embodiment is maintained within a range of ±6%. According to this, the longitudinal spherical aberration, the field curvature aberration in the sagittal direction and the field curvature aberration in the tangential direction of the present ninth embodiment are better than those of the first embodiment, and good imaging quality is provided.

Figure 42:
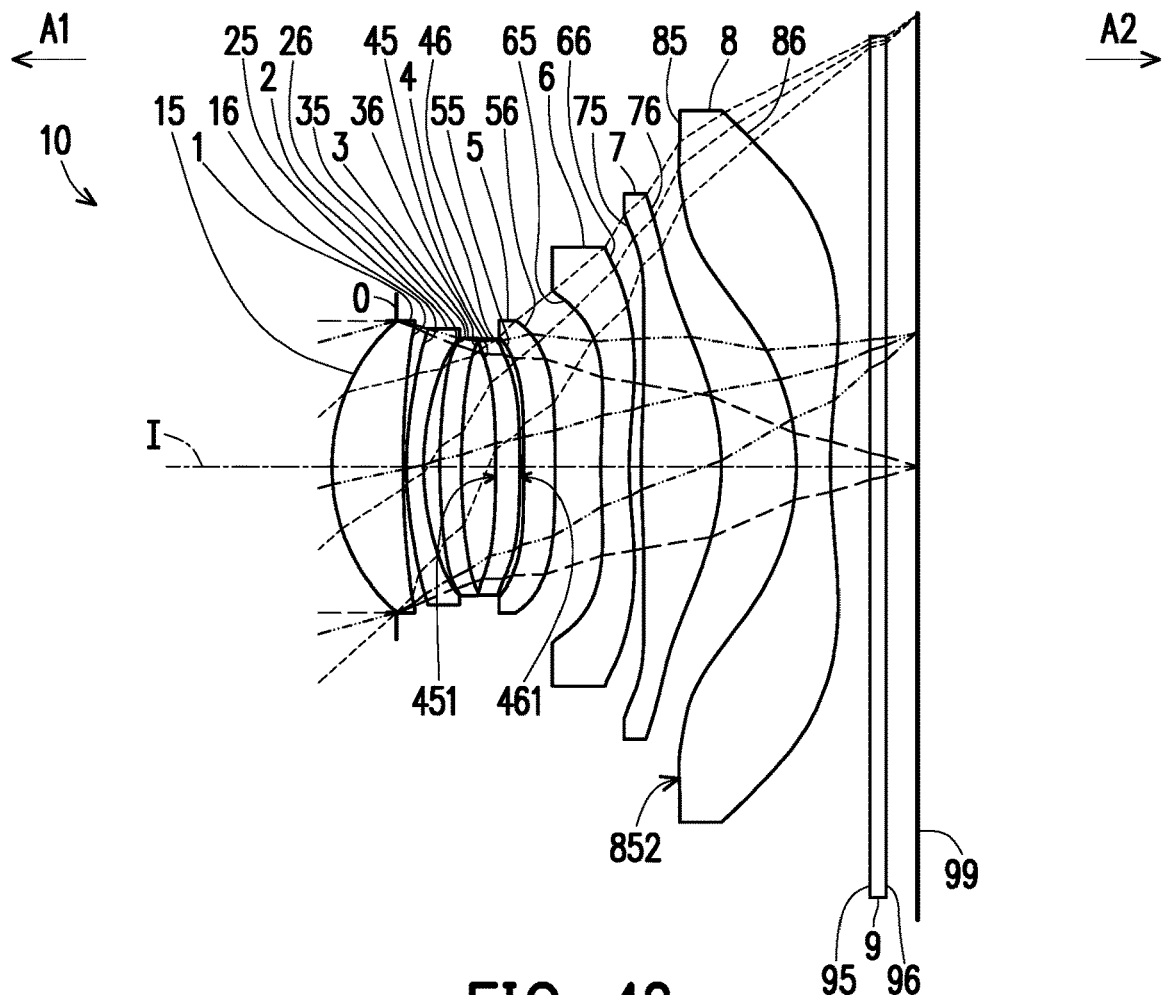
FIG. 42 is a schematic diagram of an optical imaging lens of a tenth embodiment of the invention.

FIG. 42 is a schematic diagram of an optical imaging lens of a tenth embodiment of the invention. FIG. 43A to FIG. 43D are diagrams of longitudinal spherical aberrations and various aberrations of the optical imaging lens of the tenth embodiment. Referring to FIG. 42 at first, the tenth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the tenth embodiment, the third lens element 3 has negative refracting power. The fourth lens element 4 has positive refracting power. The optical axis region 451 of the object-side surface 45 of the fourth lens element is concave, and the optical axis region 461 of the image-side surface 46 of the fourth lens element is convex. The periphery region 852 of the object-side surface 85 of the eighth lens element 8 is convex. It should be noted that in order to show the drawing clearly, numerals of the optical axis regions and the periphery regions which are similar to those in the first embodiment are omitted in FIG. 42.

Detailed optical data of the optical imaging lens 10 of the tenth embodiment are as shown in FIG. 44, and the optical imaging lens 10 of the tenth embodiment has an entire EFL of 6.191 mm, an HFOV of 41.99°, an Fno of 1.650, a system length of 7.524 mm, and an image height of 5.800 mm.

As shown in FIG. 45, various aspheric coefficients of the object-side surface 15 of the first lens element 1 to the image-side surface 86 of the eighth lens 8 of the tenth embodiment in the formula (1) are illustrated. In the present embodiment, the second-order aspheric coefficients $a_2$ of the object-side surface 15 of the first lens element 1 to the image-side surface 86 of the eighth lens element 8 are all zero.

In addition, relations among all important parameters in the optical imaging lens 10 of the tenth embodiment are as shown in FIG. 46 to FIG. 49.

Figures 43A, 43B, 43C, 43D:
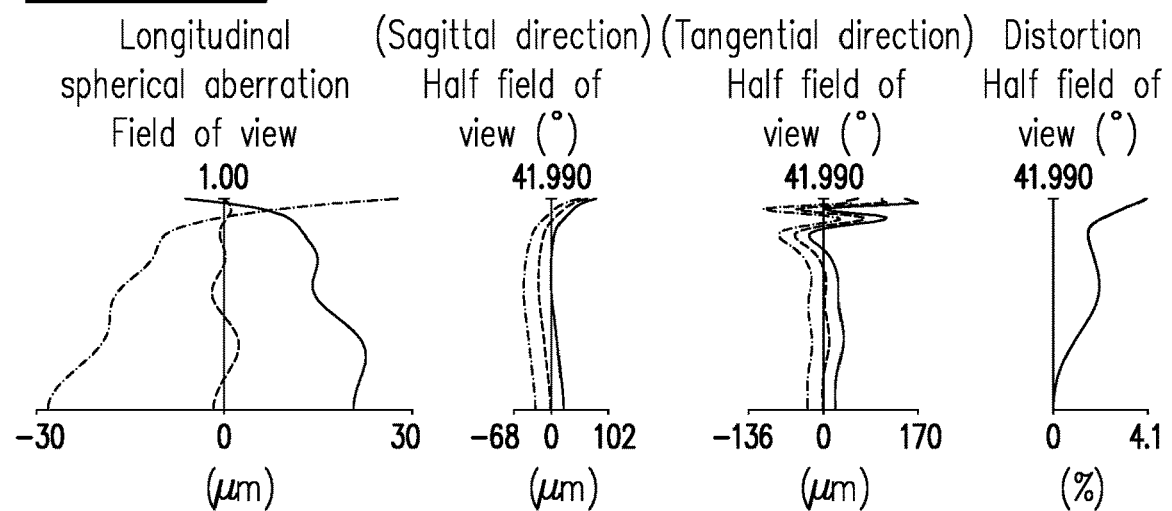
FIG. 43A to FIG. 43D are diagrams of longitudinal spherical aberrations and various aberrations of an optical imaging lens of a tenth embodiment.

FIG. 43A illustrates a longitudinal spherical aberration of the present tenth embodiment, and deflections of imaging points of off-axis rays at different heights are controlled within a range of ±30 μm. In the two field curvature aberration diagrams of FIG. 43B and FIG. 43C, focal length variables of three representative wavelengths within an entire field of view range fall within ±170 μm. The distortion aberration diagram of FIG. 43D shows that the distortion aberration of the present tenth embodiment is maintained within a range of ±4.1%. According to this, the longitudinal spherical aberration, the field curvature aberration in the sagittal direction and the field curvature aberration in the tangential direction of the present tenth embodiment are better than those of the first embodiment, and good imaging quality is provided. In addition, the system length of the tenth embodiment is less than that of the first embodiment.

Referring to FIG. 46 to FIG. 49 cooperatively, tabular diagrams of various optical parameters of the foregoing first embodiment to tenth embodiment are illustrated.

According to one embodiment of the invention, the optical imaging lens 10 satisfies the following combinations to facilitate increasing the aperture and the image height and improving the resolution at the same time: the fifth lens element 5 has positive refracting power; the optical axis region 761 of the image-side surface 76 of the seventh lens element 7 is convex, V5≤30.000; V6≤30.000 and ImgH/(D12t32+D41t52)≥2.200. In addition, the optical imaging lens 10 further satisfies at least one of the following conditions: the second lens element 2 matched has negative refracting power; the optical axis region 261 of the image-side surface 26 of the second lens element 2 is concave; the periphery region 262 of the image-side surface 26 of the second lens element 2 is concave; the optical axis region 551 of the object-side surface 55 of the fifth lens element 5 is concave or the optical axis region 651 of the object-side surface 65 of the sixth lens element 6 is convex. In addition, better limitations are 19.000≤V5≤30.000, 19.000≤V6≤30.000, 2.200≤ImgH/(D12t32+D41t52)≤3.900.

According to one embodiment of the invention, the optical imaging lens 10 satisfies the following combinations to facilitate increasing the aperture and the image height and improving the resolution at the same time: the fifth lens element 5 has positive refracting power; the optical axis region 651 of the object-side surface 65 of the sixth lens element 6 is convex; the seventh lens element 7 has positive refracting power; V5+V6≤50.000 and ImgH/(D12t32+D41t52)≥2.200. In addition, the third lens element 3 matched has positive refracting power or the periphery region 562 of the image-side surface 56 of the fifth lens element 5 is convex. In addition, better limitations are 38.000≤V5+V6≤50.000, 2.200≤ImgH/(D12t32+D41t52)≤3.900.

According to one embodiment of the invention, the optical imaging lens 10 satisfies the following combinations to facilitate increasing the aperture and the image height and improving the resolution at the same time: the periphery region 162 of the image-side surface 16 of the first lens element 1 is concave; the optical axis region 561 of the image-side surface 56 of the fifth lens element 5 is convex; the sixth lens element 6 has negative refracting power; 45.000≤V2+V3≤85.000, V5+V6≤50.000 and ImgH/(D12t32+D41t52)≥2.200. In addition, the optical imaging lens 10 further satisfies at least one of the following conditions: the third lens element 3 matched has positive refracting power; the optical axis region 651 of the object-side surface 65 of the sixth lens element 6 is convex; the optical axis region 661 of the image-side surface 66 of the sixth lens element 6 is concave or the optical axis region 761 of the image-side surface 76 of the seventh lens element 7 is convex. In addition, better limitations are 38.000≤V5+V6≤50.000, 2.200≤ImgH/(D12t32+D41t52)≤3.900.

According to one embodiment of the invention, the optical imaging lens 10 satisfies the following combinations to facilitate increasing the aperture and the image height and improving the resolution at the same time: the fourth lens element 4 has positive refracting power; the optical axis region 561 of the image-side surface 56 of the fifth lens element 5 is convex, V4+V5≤70.000, V5+V6≤50.000 and ImgH/(D12t32+D41t52)≥2.200. In addition, the optical imaging lens 10 further satisfies at least one of the following conditions: the third lens element 3 matched has positive refracting power; the optical axis region 651 of the object-side surface 65 of the sixth lens element 6 is convex; the optical axis region 661 of the image-side surface 66 of the sixth lens element 6 is concave or the optical axis region 761 of the image-side surface 76 of the seventh lens element 7 is convex. In addition, better limitations are 38.000≤V4+V5≤70.000, 38.000≤V5+V6≤50.000, 2.200≤ImgH/(D12t32+D41t52)≤3.900.

According to one embodiment of the invention, when the optical imaging lens 10 further satisfies that when the number of lens elements, in the first lens element 1 to the eighth lens element 8, having the Abbe numbers less than or equal to 40.000 is greater than or equal to 3, it is favourable for increasing the image height in the limited system length, and better limitations are: in the first lens element 1 to the eighth lens element 8, when the number of the lens elements having the Abbe numbers less than or equal to 40.000 is less than or equal to 4 and greater than or equal to 3, it is favourable for increasing the image height in the limited system length.

According to one embodiment of the invention, when the optical imaging lens 10 further satisfies that 0.750≤V4/V5≤3.000, 0.600≤V5/V6≤1.350 or 0.450≤V3/V7≤1.350, it is favourable for increasing the image height in the limited system length.

In order to maintain the thickness and air gap of each lens element at appropriate values, a situation that any parameter is too large, which is not conductive to the thinning of the entire optical imaging lens 10 is avoided, or a situation that any parameter is too small, which affects the assembling or increases the difficulty in manufacturing is avoided, so that the optical imaging lens 10 may achieve better configurations if it satisfies numerical value limits of at least one of the following conditional expressions:

ALT/G78≤6.200, and a better range is 3.000≤ALT/G78≤6.200;

(TTL+TL)/ImgH≤2.700, and a better range is 2.000≤(TTL+TL)/ImgH≤2.700;

(AAG+BFL)/D31t42≤3.600, and a better range is 2.000≤(AAG+BFL)/D31t42≤3.600;

EFL/(T1+T7+G78+T8)≤3.200, and a better range is 1.400≤EFL/(T1+T7+G78+T8)≤3.200;

D42t71/(T2+G23)≤5.000, and a better range is 2.700≤D42t71/(T2+G23)≤5.000;

(G12+D42t71+BFL)/D31t42≤3.000, and a better range is 1.600≤(G12+D42t71+BFL)/D31t42≤3.000;

(G12+T2+G23+T3)/T4≤3.900, and a better range is 1.800≤(G12+T2+G23+T3)/T4≤3.900;

(T4+G45+T6+G67)/(G23+T3)≤2.200, and a better range is 1.200≤(T4+G45+T6+G67)/(G23+T3)≤2.200;

D12t51/(T5+G56)≤2.700, and a better range is 1.100≤D12t51/(T5+G56)≤2.700;

(T6+G67+T8)/(T2+G34)≤1.800, and a better range is 0.500≤(T6+G67+T8)/(T2+G34)≤1.800;

(G12+T2+T6+G67)/(T5+G56)≤1.700, and a better range is 0.500≤(G12+T2+T6+G67)/(T5+G56)≤1.700;

(G12+T2+T4+G45+T6+G67)/T7≤2.100, and a better range is 0.500≤(G12+T2+T4+G45+T6+G67)/T7≤2.100;

D41t61/(G23+G34)≤4.000, and a better range is 1.600≤D41t61/(G23+G34)≤4.000;

(T3+D41t71)/T1≤3.700, and a better range is 1.600≤(T3+D41t71)/T1≤3.700;

(D41t71+BFL)/G78≤3.300, and a better range is 2.600≤(D41t71+BFL)/G78≤3.300;

(T2+T3+AAG)/T7≤3.700, and a better range is 1.200≤(T2+T3+AAG)/T7≤3.700;

TTL/(T1+G12+T7+G78)≤2.800, and a better range is 1.800≤TTL/(T1+G12+T7+G78)≤2.800.

In addition, any combination relationships of the parameters of the embodiments may be additionally selected to add lens limits, so as to facilitate the lens design of the same architecture of the invention.

In view of the unpredictability of optical system design, under the architecture of the invention, the optical imaging lenses, satisfying the above conditional expressions, of the embodiments of the invention may better have good imaging quality, and can have a large aperture, an increased image height and improved resolution.

The above-listed exemplary limitation relational expressions can also be arbitrarily selectively incorporated in unequal numbers to be applied to the embodiments of the invention, and they are not limited thereto. During the implementation of the invention, in addition to the aforementioned relational expressions, detailed structures, such as the arrangement of concave and convex surfaces, of other more lenses can also be designed for a single lens or broadly for a plurality of lenses to enhance the system performance and/or control of the resolution. It should be noted that these details need to be selectively incorporated in other embodiments of the invention without conflicts.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

The invention has been disclosed above with embodiments; however, the embodiments are not intended to limit the invention. Any person of ordinary skill in the art can make some changes and modifications without departing from the spirit and scope of the invention. Thus, the protection scope of the invention should be subject to that defined by the appended claims.

What is claimed is:

1. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

the second lens element has negative refracting power;
the fifth lens element has positive refracting power;
an optical axis region of the image-side surface of the seventh lens element is convex;
the optical imaging lens satisfies one of a first condition and a second condition, where the first condition is that a periphery region of the object-side surface of the fourth lens element is concave, and the second condition is that a periphery region of the image-side surface of the fourth lens element is convex;
lens elements of the optical imaging lens are only the eight lens elements, and satisfy the following conditional expressions: $V5 \leq 30.000$, $V6 \leq 30.000$, and $ImgH/(D12t32+D41t52) \geq 2.200$;
wherein V5 and V6 respectively refer to Abbe numbers of the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

2. The optical imaging lens according to claim 1, wherein the optical imaging lens further satisfies: $ALT/G78 \leq 6.200$, wherein ALT is a sum of the thicknesses of the eight lens elements from the first lens element to the eighth lens element on the optical axis, and G78 is an air gap between the seventh lens element and the eighth lens element on the optical axis.

3. The optical imaging lens according to claim 1, wherein the optical imaging lens further satisfies: $(TTL+TL)/ImgH \leq 2.700$, wherein TTL is a distance from the object-side surface of the first lens element to an image plane on the optical axis, and TL is a distance from the object-side surface of the first lens element to the image-side surface of the eighth lens element on the optical axis.

4. The optical imaging lens according to claim 1, wherein the optical imaging lens further satisfies: $(AAG+BFL)/D31t42 \leq 3.600$, wherein AAG is a sum of seven air gaps between the first lens element to the eighth lens element on the optical axis; BFL is a distance from the image-side surface of the eighth lens element to an image plane on the optical axis, and D31t42 is a distance from the object-side surface of the third lens element to the image-side surface of the fourth lens element on the optical axis.

5. The optical imaging lens according to claim 1, wherein the optical imaging lens further satisfies: $EFL/(T1+T7+G78+T8) \leq 3.200$, wherein EFL is an effective focal length of the optical imaging lens; T1 is a thickness of the first lens element on the optical axis; T7 is a thickness of the seventh lens element on the optical axis; T8 is a thickness of the eighth lens element on the optical axis, and G78 is an air gap between the seventh lens element and the eighth lens element on the optical axis.

6. The optical imaging lens according to claim 1, wherein the optical imaging lens further satisfies: $D42t71/(T2+G23) \leq 5.000$, wherein D42t71 is a distance from the image-side surface of the fourth lens element to the object-side surface of the seventh lens element on the optical axis; T2 is a thickness of the second lens element on the optical axis, and G23 is an air gap between the second lens element and the third lens element on the optical axis.

7. The optical imaging lens according to claim 1, wherein the optical imaging lens further satisfies: $(G12+D42t71+BFL)/D31t42 \leq 3.000$, wherein G12 is an air gap between the first lens element and the second lens element on the optical axis; D42t71 is a distance from the image-side surface of the fourth lens element to the object-side surface of the seventh lens element on the optical axis; BFL is a distance from the image-side surface of the eighth lens element to an image plane on the optical axis, and D31t42 is a distance from the object-side surface of the third lens element to the image-side surface of the fourth lens element on the optical axis.

8. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

a periphery region of the image-side surface of the fourth lens element is convex;
the fifth lens element has positive refracting power, and a periphery region of the image-side surface of the fifth lens element is convex;
an optical axis region of the object-side surface of the sixth lens element is convex;
the seventh lens element has positive refracting power;
lens elements of the optical imaging lens are only the eight lens elements, and satisfy the following conditional expressions: $V5+V6 \leq 50.000$ and $ImgH/(D12t32+D41t52) \geq 2.200$;
wherein V5 and V6 respectively refer to Abbe numbers of the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

9. The optical imaging lens according to claim 8, wherein the optical imaging lens further satisfies: $(G12+T2+G23+T3)/T4 \leq 3.900$, wherein G12 is an air gap between the first lens element and the second lens element on the optical axis; G23 is an air gap between the second lens element and the third lens element on the optical axis, and T2, T3 and T4 are respectively the thicknesses of the second lens element, the third lens element and the fourth lens element on the optical axis.

10. The optical imaging lens according to claim 8, wherein the optical imaging lens further satisfies: $(T4+G45+T6+G67)/(G23+T3) \leq 2.200$, wherein T3, T4 and T6 are respectively the thicknesses of the third lens element, the fourth lens element and the sixth lens element on the optical axis; G45 is an air gap between the fourth lens element and the fifth lens element on the optical axis; G67 is an air gap between the sixth lens element and the seventh lens element on the optical axis, and G23 is an air gap between the second lens element and the third lens element on the optical axis.

11. The optical imaging lens according to claim 8, wherein the optical imaging lens further satisfies: $D12t51/(T5+G56) \leq 2.700$, wherein D12t51 is a distance from the image-side surface of the first lens element to the object-side surface of the fifth lens element on the optical axis; T5 is a thickness of the fifth lens element on the optical axis, and G56 is an air gap between the fifth lens element and the sixth lens element on the optical axis.

12. The optical imaging lens according to claim 8, wherein the optical imaging lens further satisfies: $(T6+G67+T8)/(T2+G34) \leq 1.800$, wherein T2, T6 and T8 are respectively the thicknesses of the second lens element, the sixth lens element and the eighth lens element on the optical axis; G34 is an air gap between the third lens element and the fourth lens element on the optical axis, and G67 is an air gap between the sixth lens element and the seventh lens element on the optical axis.

13. The optical imaging lens according to claim 8, wherein the optical imaging lens further satisfies: $(G12+T2+T6+G67)/(T5+G56) \leq 1.700$, wherein T2, T5 and T6 are respectively the thicknesses of the second lens element, the fifth lens element and the sixth lens element on the optical axis; G12 is an air gap between the first lens element and the second lens element on the optical axis; G67 is an air gap between the sixth lens element and the seventh lens element on the optical axis, and G56 is an air gap between the fifth lens element and the sixth lens element on the optical axis.

14. The optical imaging lens according to claim 8, wherein the optical imaging lens further satisfies: $(G12+T2+T4+G45+T6+G67)/T7 \leq 2.100$, wherein T2, T4, T6 and T7 are respectively the thicknesses of the second lens element, the fourth lens element, the sixth lens element and the seventh lens element on the optical axis; G12 is an air gap between the first lens element and the second lens element on the optical axis; G45 is an air gap between the fourth lens element and the fifth lens element on the optical axis, and G67 is an air gap between the sixth lens element and the seventh lens element on the optical axis.

15. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;
a periphery region of the image-side surface of the first lens element is concave;
an optical axis region of the image-side surface of the fifth lens element is convex;
the sixth lens element has negative refracting power;
an optical axis region of the image-side surface of the seventh lens element is convex;
the optical imaging lens satisfies one of a first condition and a second condition, where the first condition is that a periphery region of the object-side surface of the fourth lens element is concave, and the second condition is that a periphery region of the image-side surface of the fourth lens element is convex;
lens elements of the optical imaging lens are only the eight lens elements, and satisfy the following conditional expressions: $45.000 \leq V2+V3 \leq 85.000$, $V5+V6 \leq 50.000$ and $ImgH/(D12t32+D41t52) \geq 2.200$;
wherein V2, V3, V5 and V6 respectively refer to Abbe numbers of the second lens element, the third lens element, the fifth lens element and the sixth lens element, ImgH is an image height of the optical imaging lens, D12t32 is a distance from the image-side surface of the first lens element to the image-side surface of the third lens element on the optical axis, and D41t52 is a distance from the object-side surface of the fourth lens element to the image-side surface of the fifth lens element on the optical axis.

16. The optical imaging lens according to claim 15, wherein the optical imaging lens further satisfies: $D41t61/(G23+G34) \leq 4.000$, wherein D41t61 is a distance from the object-side surface of the fourth lens element to the object-side surface of the sixth lens element on the optical axis; G23 is an air gap between the second lens element and the third lens element on the optical axis, and G34 is an air gap between the third lens element and the fourth lens element on the optical axis.

17. The optical imaging lens according to claim 15, wherein the optical imaging lens further satisfies: $(T3+D41t71)/T1 \leq 3.700$, wherein T1 and T3 are respectively the thicknesses of the first lens element and the third lens element on the optical axis, and D41t71 is a distance from the object-side surface of the fourth lens element to the object-side surface of the seventh lens element on the optical axis.

18. The optical imaging lens according to claim 15, wherein the optical imaging lens further satisfies: $(D41t71+BFL)/G78 \leq 3.300$, wherein D41t71 is a distance from the object-side surface of the fourth lens element to the object-side surface of the seventh lens element on the optical axis; BFL is a distance from the image-side surface of the eighth lens element to an image plane on the optical axis, and G78 is an air gap between the seventh lens element and the eighth lens element on the optical axis.

19. The optical imaging lens according to claim 15, wherein the optical imaging lens further satisfies: $(T2+T3+AAG)/T7 \leq 3.700$, wherein T2, T3 and T7 are respectively the thicknesses of the second lens element, the third lens element and the seventh lens element on the optical axis, and AAG is a sum of seven air gaps from the first lens element to the eighth lens element on the optical axis.

20. The optical imaging lens according to claim 15, wherein the optical imaging lens further satisfies: $TTL/(T1+G12+T7+G78) \leq 2.800$, wherein TTL is a distance from the object-side surface of the first lens element to an image plane on the optical axis; T1 and T7 are respectively the thicknesses of the first lens element and the seventh lens element on the optical axis; G12 is an air gap between the first lens element and the second lens element on the optical axis, and G78 is an air gap between the seventh lens element and the eighth lens element on the optical axis.

* * * * *